(12) United States Patent
Onitsuka et al.

(10) Patent No.: US 11,865,800 B2
(45) Date of Patent: Jan. 9, 2024

(54) TIRE MOLD AND PRODUCTION METHOD FOR TIRE USING A TIRE MOLD

(71) Applicant: Sumitomo Rubber Industries, Ltd., Kobe (JP)

(72) Inventors: Rena Onitsuka, Kobe (JP); Ryuhei Sanae, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 0 days.

(21) Appl. No.: 17/528,190

(22) Filed: Nov. 17, 2021

(65) Prior Publication Data
US 2022/0152960 A1     May 19, 2022

(30) Foreign Application Priority Data
Nov. 19, 2020   (JP) ................. 2020-192298

(51) Int. Cl.
    *B29D 30/06*     (2006.01)
    *B60C 11/00*     (2006.01)
    (Continued)

(52) U.S. Cl.
    CPC ...... *B29D 30/0606* (2013.01); *B60C 11/0083* (2013.01); *B60C 11/0332* (2013.01); *B60C 11/13* (2013.01); *B60C 11/1376* (2013.01); *B60C 11/1392* (2013.01); *B29D 2030/0612* (2013.01); *B29D 2030/0616* (2013.01)

(58) Field of Classification Search
CPC . B60C 11/01; B60C 11/0318; B60C 11/0332; B60C 2011/0341
See application file for complete search history.

(56) References Cited

U.S. PATENT DOCUMENTS 9,150,056 B2 * 10/2015 Sanae ................. B60C 11/1369
9,764,596 B2 *   9/2017 Sanae ................. B60C 11/0304
(Continued)

FOREIGN PATENT DOCUMENTS

DE     102015212995 A1    1/2016
JP     2014-61602 A         4/2014
(Continued)

OTHER PUBLICATIONS

Extended European search report dated Apr. 13, 2022, in corresponding European patent Application No. 21205545.3, 8 pages.

*Primary Examiner* — Benjamin A Schiffman
(74) *Attorney, Agent, or Firm* — XSENSUS LLP

(57) ABSTRACT

A mold includes a tread-forming surface to shape a tread surface. The tread-forming surface can include projections to form circumferential grooves, and land surface-forming portions to form land surfaces. Among the three land surface-forming portions aligned in an axial direction with the projections interposed therebetween, the land surface-forming portion located between the two projections can be a curved land surface-forming portion. A contour of the curved land surface-forming portion can be represented by one or more circular arcs. A boundary between a reference side surface of each projection and the curved land surface-forming portion can be a reference boundary point, and the reference boundary point can be located inward of a reference forming surface of the tread-forming surface.

15 Claims, 10 Drawing Sheets

(51) Int. Cl.
    *B60C 11/03*      (2006.01)
    *B60C 11/13*      (2006.01)

(56) References Cited

U.S. PATENT DOCUMENTS

| | | | |
|---|---|---|---|
| 10,150,337 B2 * | 12/2018 | Tada | B60C 11/0304 |
| 10,800,120 B2 * | 10/2020 | Komori | B29D 30/0606 |
| 10,946,702 B2 * | 3/2021 | Sanae | B60C 13/02 |
| 11,072,206 B2 * | 7/2021 | Sakamoto | B60C 11/0083 |
| 2016/0009142 A1 | 1/2016 | Tada | |
| 2019/0202245 A1 * | 7/2019 | Sanae | B60C 13/02 |
| 2019/0217667 A1 | 7/2019 | Sakamoto | |
| 2019/0225022 A1 * | 7/2019 | Sakamoto | B60C 11/0316 |
| 2021/0229383 A1 * | 7/2021 | Uno | B29D 30/0606 |
| 2022/0063337 A1 * | 3/2022 | Onitsuka | B60C 11/0332 |

FOREIGN PATENT DOCUMENTS

| | | | | |
|---|---|---|---|---|
| JP | 2016-016823 A | | 2/2016 | |
| JP | 2016-055722 A | | 4/2016 | |
| JP | 2017024714 A | * | 2/2017 | B29C 33/42 |

* cited by examiner

CONVENTIONAL

CONVENTIONAL

TIRE MOLD AND PRODUCTION METHOD FOR TIRE USING A TIRE MOLD

CROSS-REFERENCE TO RELATED APPLICATION

This application claims priority on Japanese Patent Application No. 2020-192298 filed on Nov. 19, 2020, the entire content of which is incorporated herein by reference.

TECHNICAL FIELD

The present disclosure and embodiments thereof relate to tire molds, production methods for tires, and tires.

BACKGROUND

A tire can be obtained by pressurizing and heating a tire in an uncrosslinked state (hereinafter, unvulcanized tire) within a mold. A plurality of circumferential grooves may be formed on the tread of the tire so as to be aligned in the axial direction, whereby land portions may be formed therein. In order to form the circumferential grooves, projections corresponding to the circumferential grooves can be provided on a tread-forming surface of the mold. By pressing the unvulcanized tire against the projections, the circumferential grooves can be formed on the tread.

The tire can include, for example, a belt including a relatively large number of aligned cords, on the radially inner side of the tread. Various measures can be taken in the production of tires such that the belt does not become wavy as a result of pressing the unvulcanized tire against the projections (for example, Japanese Laid-Open Patent Publication No. 2014-61602).

SUMMARY

According to an aspect, a tire mold used for producing a tire including a tread having a tread surface to come into contact with a road surface, at least two circumferential grooves being formed on the tread, thereby forming at least three land portions in the tread, the tread surface including the at least two circumferential grooves and at least three land surfaces that are outer surfaces of the at least three land portions is disclose or provided. The tire mold can comprise: a tread-forming surface to shape the tread surface, wherein the tread-forming surface includes projections to form the circumferential grooves and land surface-forming portions to form the land surfaces, a surface that has a contour represented by at least one circular arc and that is tangent to the three land surface-forming portions aligned in an axial direction with the projections interposed therebetween is a reference forming surface of the tread-forming surface, among the three land surface-forming portions, a land surface-forming portion located between the two projections is a curved land surface-forming portion, the projections each include a reference side surface that is a side surface on the land surface-forming portion side, and a back side surface that is a side surface located on a back side of the reference side surface, a tangent point between the curved land surface-forming portion and the reference forming surface is a reference tangent point, a boundary between the reference side surface and the curved land surface-forming portion is a reference boundary point, a point of intersection of the reference forming surface and a virtual line of the reference side surface that extends from the reference boundary point toward the reference forming surface is a reference virtual point of intersection, a contour of the curved land surface-forming portion is represented by one or more circular arcs, the reference boundary point is located inward of the reference forming surface, and under a condition that a first projection of the two projects has a first cross-sectional area, and the second projection of the two projects has a second cross-sectional area greater than the first cross-sectional area of the first projection, a first distance from the reference virtual point of intersection to the reference boundary point on the one projection side is shorter compared to a second distance from the reference virtual point of intersection to the reference boundary point on the other projection side is longer.

According to another aspect, a production method for a tire including a tread having a tread surface to come into contact with a road surface, at least two circumferential grooves being formed on the tread, thereby forming at least three land portions in the tread, the tread surface including the at least two circumferential grooves and at least three land surfaces that are outer surfaces of the at least three land portions is disclosed or implemented. The production method can comprise: pressurizing and heating an unvulcanized tire by using a tire mold, wherein the tire mold comprises: a tread-forming surface to shape the tread surface, wherein the tread-forming surface includes projections to form the circumferential grooves and land surface-forming portions to form the land surfaces, a surface that has a contour represented by at least one circular arc and that is tangent to the three land surface-forming portions aligned in an axial direction with the projections interposed therebetween is a reference forming surface of the tread-forming surface, among the three land surface-forming portions, a land surface-forming portion located between the two projections is a curved land surface-forming portion, the projections each include a reference side surface that is a side surface on the land surface-forming portion side, and a back side surface that is a side surface located on a back side of the reference side surface, a tangent point between the curved land surface-forming portion and the reference forming surface is a reference tangent point, a boundary between the reference side surface and the curved land surface-forming portion is a reference boundary point, a point of intersection of the reference forming surface and a virtual line of the reference side surface that extends from the reference boundary point toward the reference forming surface is a reference virtual point of intersection, a contour of the curved land surface-forming portion is represented by one or more circular arcs, the reference boundary point is located inward of the reference forming surface, and under a condition that a first projection of the two projects has a first cross-sectional area, and the second projection of the two projects has a second cross-sectional area greater than the first cross-sectional area of the first projection, a first distance from the reference virtual point of intersection to the reference boundary point on the one projection side is shorter compared to a second distance from the reference virtual point of intersection to the reference boundary point on the other projection side is longer.

According to another aspect, a tire is disclosed or provided. The tire can comprise a tread having a tread surface to come into contact with a road surface, at least two circumferential grooves being formed on the tread, thereby forming at least three land portions in the tread, the tread surface including the at least two circumferential grooves and at least three land surfaces that are outer surfaces of the at least three land portions, wherein a surface that has a contour represented by at least one circular arc and that is tangent to the three land surfaces aligned in an axial direction with the circumferential grooves interposed therebetween is a reference surface of the tread surface, among the three land surfaces, a land surface located between the two circumferential grooves is a curved land surface, the circumferential grooves each include a reference wall that is a wall on the curved land surface side, and a facing wall that is a wall facing the reference wall, a tangent point between the curved land surface and the reference surface is a reference tangent point, a boundary between the reference wall and the curved land surface is a reference boundary point, a point of intersection of the reference surface and a virtual line of the reference wall that extends from the reference boundary point toward the reference surface is a reference virtual point of intersection, a contour of the curved land surface is represented by one or more circular arcs, the reference boundary point is located inward of the reference surface, and when one circumferential groove has a smaller groove cross-sectional area, and the other circumferential groove has a larger groove cross-sectional area, a distance from the reference virtual point of intersection to the reference boundary point on the one circumferential groove side is shorter, and a distance from the reference virtual point of intersection to the reference boundary point on the other circumferential groove side is longer.

DETAILED DESCRIPTION

Figure 1:
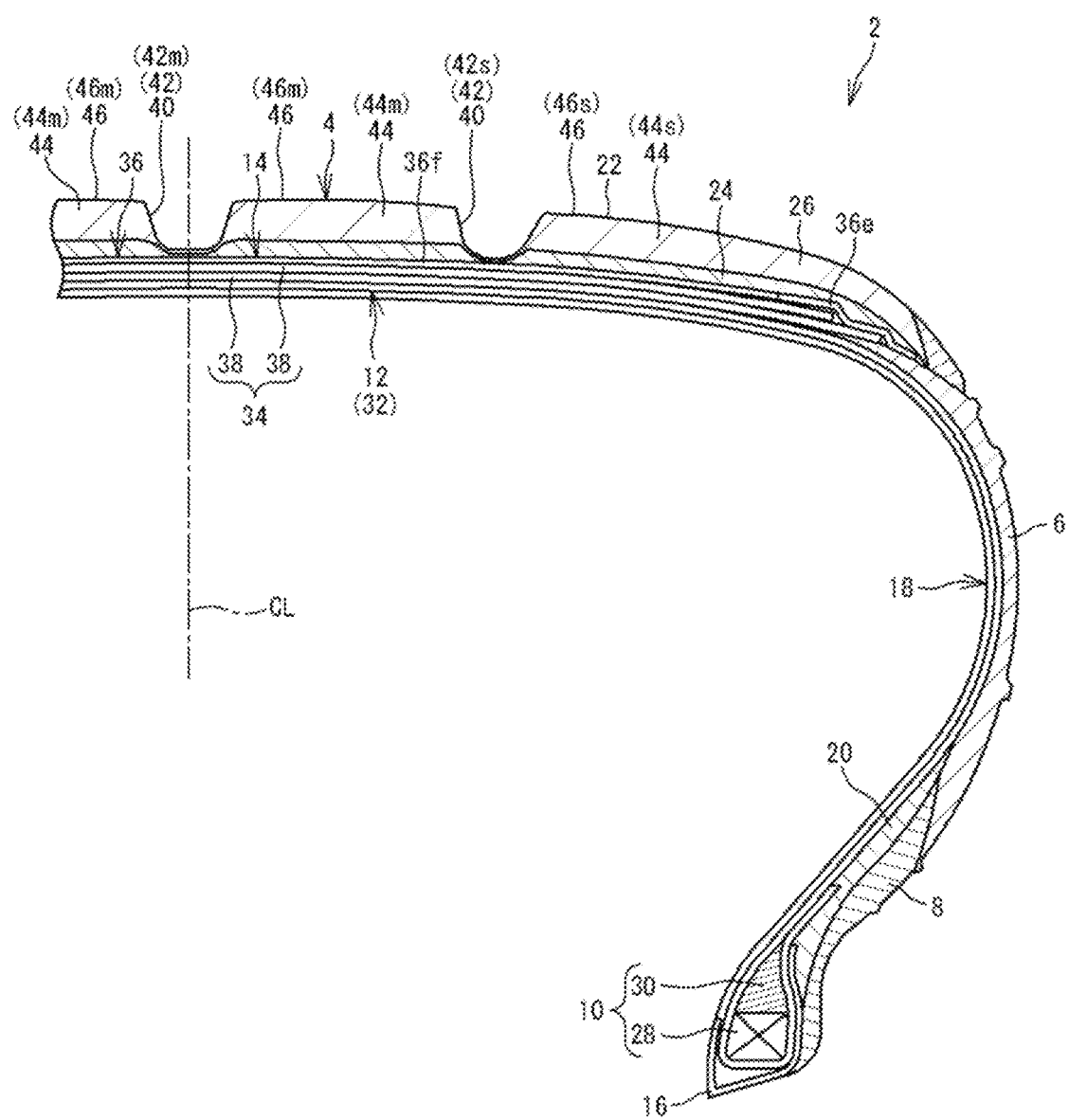
FIG. 1 is a cross-sectional view showing a part of a tire according to one or more embodiments of the present disclosure.

The following will describe in detail embodiments of the present disclosure with appropriate reference to the drawings.

In the present disclosure, a state where a tire is fitted on a normal rim, the internal pressure of the tire is adjusted to a normal internal pressure, and no load is applied to the tire can be referred to as a normal state. In the present disclosure, unless otherwise specified, the dimensions and angles of each component of the tire are measured in the normal state.

The normal rim can mean or represent a rim specified in a standard on which the tire is based. The "standard rim" in the JATMA standard, the "Design Rim" in the TRA standard, and the "Measuring Rim" in the ETRTO standard can be considered or characterized as normal rims.

The normal internal pressure can mean or represent an internal pressure specified in the standard on which the tire is based. The "highest air pressure" in the JATMA standard, the "maximum value" recited in "TIRE LOAD LIMITS AT VARIOUS COLD INFLATION PRESSURES" in the TRA standard, and the "INFLATION PRESSURE" in the ETRTO standard can be considered or characterized as normal internal pressures. The normal internal pressure of a tire for a passenger car may be, for example, 180 kPa.

A normal load can mean or represent a load specified in the standard on which the tire is based. The "maximum load capacity" in the JATMA standard, the "maximum value" recited in the "TIRE LOAD LIMITS AT VARIOUS COLD INFLATION PRESSURES" in the TRA standard, and the "LOAD CAPACITY" in the ETRTO standard can be considered or characterized as normal loads. The normal load of a tire for a passenger car may be, for example, a load corresponding to 88% of the above load.

When the projections are pressed against the unvulcanized tire, a part of a rubber composition in an unvulcanized state (hereinafter, unvulcanized rubber) pressed by the projections can flow into portions where the land portions are to be formed. At this time, if the unvulcanized rubber does not flow easily, there may be a concern that disturbance may occur in the inner surface shape of the tread and the belt may become wavy. In particular, in the case of forming a circumferential groove having a groove width of not less than 9 mm and a large groove cross-sectional area of not less than 45 $mm^2$ on the tread, the volume of the unvulcanized rubber pressed by the projection may be large, so that there may be a concern that the unvulcanized rubber pushed away by this projection may disturb the overall flow of the unvulcanized rubber that flows into the portions where the land portions are to be formed. In this case, it may be difficult to form land portions in which the shapes of the portions of the mold where the land portions are to be formed are reflected, so that a land portion that is thin at a center portion thereof and that is thick at an edge portion thereof, in other words, a land portion having a land surface formed in a shape that is convex inward, may be formed.

Figure 9:
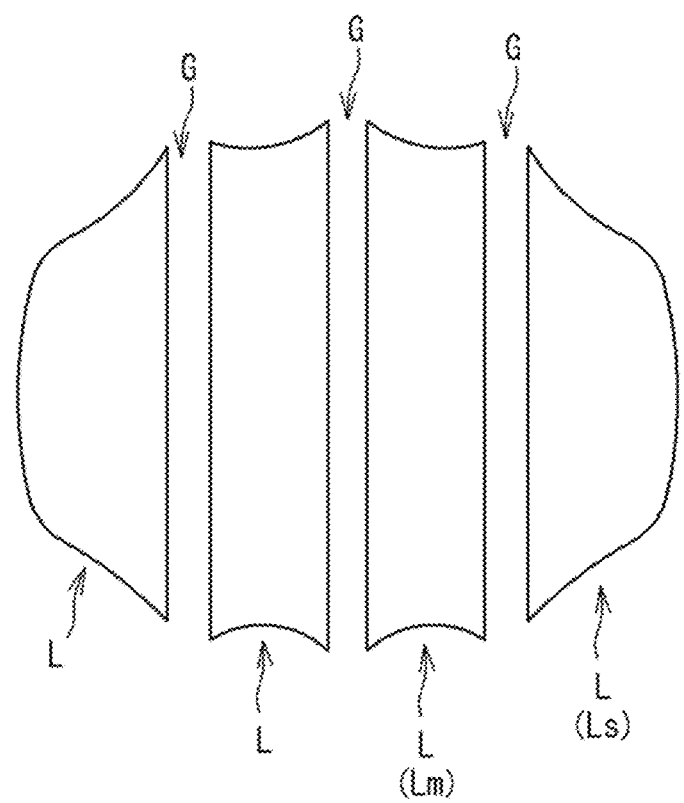
FIG. 9 is a schematic diagram showing an example of a ground-contact surface shape of a tire produced by a conventional mold.
Figure 10:
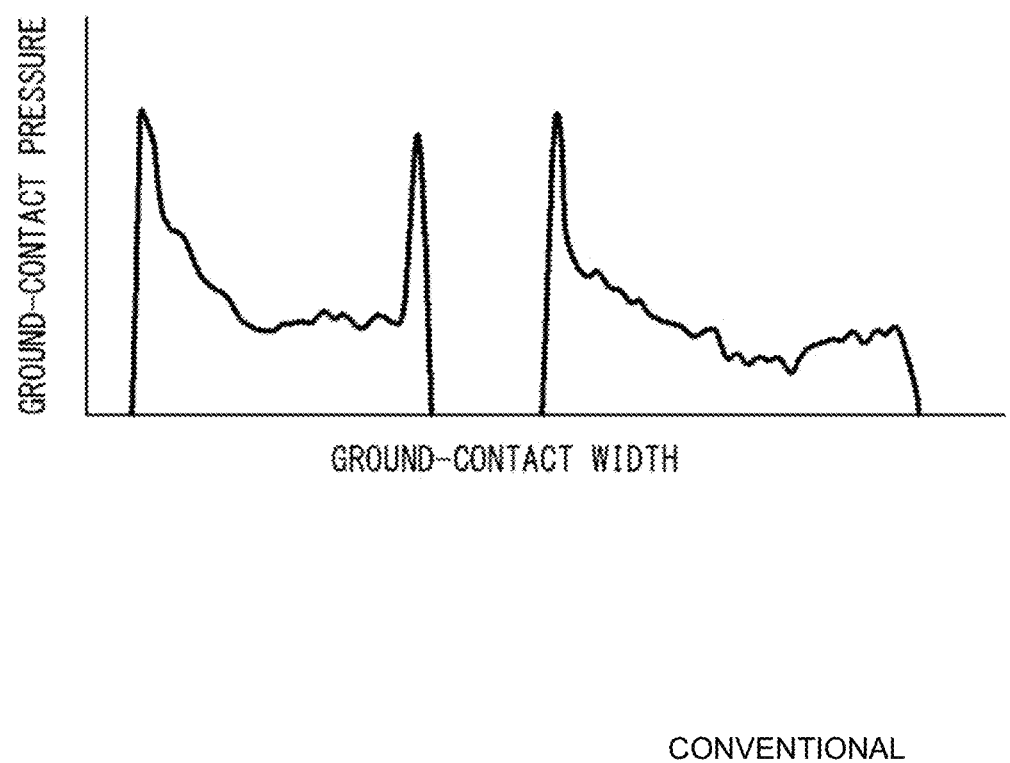
FIG. 10 is a graph showing an example of a ground-contact pressure distribution of the tire produced by the conventional mold.

FIG. 9 shows a ground-contact surface shape of a conventional tire (size=205/55R16) produced without considering the flow of an unvulcanized rubber pushed away by projections. FIG. 9 shows the contour of each land portion L included in the ground-contact surface. FIG. 10 shows a ground-contact pressure distribution of the tire. In FIG. 10, the right side shows a ground-contact pressure distribution of a shoulder land portion Ls, and the left side shows a ground-contact pressure distribution of a middle land portion Lm.

As shown in FIG. 9, in the ground-contact surface shape, the outer edge in the circumferential direction of each land portion L has a shape that is convex inward. As shown in FIG. 10, it is confirmed that the ground-contact pressure is locally increased at the edge of each land portion L. Specifically, a ground-contact pressure difference of about 200 kPa is confirmed in the middle land portion Lm, and a ground-contact pressure difference of about 250 kPa is confirmed in the shoulder land portion Ls. Furthermore, in the tire, it is also confirmed that disturbance has occurred in the inner surface shape of the tread.

The flow of the unvulcanized rubber in the mold influences the ground-contact surface shape and the ground-contact pressure distribution of the tire. In other words, by controlling the flow of the unvulcanized rubber in the mold, the tire can be more sufficiently brought into contact with a road surface, so that it is expected that steering stability can be further improved. In this case, a local increase in ground-contact pressure is also suppressed, so that it is also expected that wear resistance can be improved.

Embodiments of the present disclosure have been made in view of the above circumstances, and an object of one or more embodiments the present disclosure, among other objects, can be to provide a tire mold and a production method for a tire that are capable of making a ground-contact surface shape and a ground-contact pressure distribution appropriate, and a tire having a ground-contact surface shape and a ground-contact pressure distribution that are made appropriate.

A tire mold according to an aspect of one or more embodiments of the present disclosure is a mold used for producing a tire including a tread having a tread surface that comes into contact with a road surface, at least two circumferential grooves being formed on the tread, thereby forming at least three land portions in the tread, the tread surface including the at least two circumferential grooves and at least three land surfaces that are outer surfaces of the at least three land portions. The tire mold includes a tread-forming surface for shaping the tread surface. The tread-forming surface includes projections for forming the circumferential grooves and land surface-forming portions for forming the land surfaces. A surface that has a contour represented by at least one circular arc and that is tangent to the three land surface-forming portions aligned in an axial direction with the projections interposed therebetween is a reference forming surface of the tread-forming surface. Among the three land surface-forming portions, a land surface-forming portion located between the two projections is a curved land surface-forming portion. The projections each include a reference side surface that is a side surface on the land surface-forming portion side, and a back side surface that is a side surface located on a back side of the reference side surface. A tangent point between the curved land surface-forming portion and the reference forming surface is a reference tangent point. A boundary between the reference side surface and the curved land surface-forming portion is a reference boundary point. A point of intersection of the reference forming surface and a virtual line of the reference side surface that extends from the reference boundary point toward the reference forming surface is a reference virtual point of intersection. A contour of the curved land surface-forming portion is represented by one or more circular arcs. The reference boundary point is located inward of the reference forming surface. When one projection has a smaller cross-sectional area, and the other projection has a larger cross-sectional area, a distance from the reference virtual point of intersection to the reference boundary point on the one projection side is shorter, and a distance from the reference virtual point of intersection to the reference boundary point on the other projection side is longer.

Preferably, in the tire mold, when a distance from the reference virtual point of intersection to the reference tangent point on the one projection side is denoted by $Xw1m$, a distance from the reference virtual point of intersection on the one projection side to the reference virtual point of intersection on the other projection side is denoted by $Wcm$, a cross-sectional area of the one projection is denoted by $Sam$, and a cross-sectional area of the other projection is denoted by $Sbm$, the distance $Xw1m$ from the reference virtual point of intersection to the reference tangent point on the one projection side is set such that the following formula (1) is satisfied.

$$Sam/(Sam+Sbm)\times 100-10 \leq Xw1m/Wcm \times 100 \leq Sam/(Sam+Sbm)\times 100+10 \qquad (1)$$

Preferably, in the tire mold, a ratio of the distance from the reference virtual point of intersection to the reference boundary point to the cross-sectional area of the projection is not less than 0.0008 and not greater than 0.0040.

Preferably, in the tire mold, of the contour of the curved land surface-forming portion, a contour from the reference tangent point to the reference boundary point is represented by a circular arc that passes through the reference boundary point and that is tangent to the reference forming surface at the reference tangent point.

Preferably, in the tire mold, among the land surface-forming portions included in the tread-forming surface, a land surface-forming portion located on an outer side in the axial direction is a shoulder land surface-forming portion. Among the three land surface-forming portions, a land surface-forming portion located adjacent to the curved land surface-forming portion is the shoulder land surface-forming portion. A side surface on the curved land surface-forming portion side of a projection located between the shoulder land surface-forming portion and the curved land surface-forming portion is the reference side surface, and a side surface on the shoulder land surface-forming portion side of said projection is the back side surface. A tangent point between the shoulder land surface-forming portion and the reference forming surface is a shoulder reference tangent point. A boundary between the back side surface and the shoulder land surface-forming portion is a shoulder reference boundary point. A point of intersection of the reference forming surface and a virtual line of the back side surface that extends from the shoulder reference boundary point to the reference forming surface is a shoulder reference virtual point of intersection. A distance from the shoulder reference virtual point of intersection to the shoulder reference boundary point at the back side surface is equal to a distance from the reference virtual point of intersection to the reference boundary point at the reference side surface. A distance from the shoulder reference virtual point of intersection to the shoulder reference tangent point is equal to the distance from the reference virtual point of intersection to the reference tangent point. Of a contour of the shoulder land surface-forming portion, a contour from the shoulder reference tangent point to the shoulder reference boundary point is represented by a circular arc that passes through the shoulder reference boundary point and that is tangent to the reference forming surface at the shoulder reference tangent point.

Preferably, in the tire mold, any position that is on a virtual line of the reference side surface and that is between the reference boundary point and the reference virtual point of intersection is a vertical point. A circular arc that passes through the vertical point and that is tangent to the reference forming surface at the reference tangent point is a tangent point-side circular arc. Any position that is on the reference forming surface and that is between the reference tangent point and the reference virtual point of intersection is a horizontal point. A point of intersection of the tangent point-side circular arc and a normal line that passes through the horizontal point and that is normal to the reference forming surface is an intermediate boundary point. A circular arc that passes through the reference boundary point and that is tangent to the tangent point-side circular arc at the intermediate boundary point is a boundary-side circular arc. Of the contour of the curved land surface-forming portion, a contour from the reference tangent point to the intermediate boundary point is represented by the tangent point-side circular arc, and a contour from the intermediate boundary point to the reference boundary point is represented by the boundary-side circular arc.

Preferably, in the tire mold, a ratio of a distance from the reference virtual point of intersection to the vertical point to the distance from the reference virtual point of intersection to the reference boundary point is not less than 0.40 and not greater than 0.60. A ratio of a distance from the reference virtual point of intersection to the horizontal point to the distance from the reference virtual point of intersection to the reference tangent point is not less than 0.40 and not greater than 0.60.

Preferably, in the tire mold, among the land surface-forming portions included in the tread-forming surface, a land surface-forming portion located on an outer side in the axial direction is a shoulder land surface-forming portion. Among the three land surface-forming portions, a land surface-forming portion located adjacent to the curved land surface-forming portion is the shoulder land surface-forming portion. A side surface on the curved land surface-forming portion side of a projection located between the shoulder land surface-forming portion and the curved land surface-forming portion is the reference side surface, and a side surface on the shoulder land surface-forming portion side of said projection is the back side surface. A tangent point between the shoulder land surface-forming portion and the reference forming surface is a shoulder reference tangent point. A boundary between the back side surface and the shoulder land surface-forming portion is a shoulder reference boundary point. A point of intersection of the reference forming surface and a virtual line of the back side surface that extends from the shoulder reference boundary point to the reference forming surface is a shoulder reference virtual point of intersection. A distance from the shoulder reference virtual point of intersection to the shoulder reference boundary point at the back side surface is equal to a distance from the reference virtual point of intersection to the reference boundary point at the reference side surface. A distance from the shoulder reference virtual point of intersection to the shoulder reference tangent point is equal to the distance from the reference virtual point of intersection to the reference tangent point. Any position that is on the virtual line of the back side surface and that is between the shoulder reference boundary point and the shoulder reference virtual point of intersection is a shoulder vertical point. A circular arc that passes through the shoulder vertical point and that is tangent to the reference forming surface at the shoulder reference tangent point is a shoulder tangent point-side circular arc. Any position that is on the reference forming surface and that is between the shoulder reference tangent point and the shoulder reference virtual point of intersection is a shoulder horizontal point. A point of intersection of the shoulder tangent point-side circular arc and a normal line that passes through the shoulder horizontal point and that is normal to the reference forming surface is a shoulder intermediate boundary point. A circular arc that passes through the shoulder reference boundary point and that is tangent to the shoulder tangent point-side circular arc at the shoulder intermediate boundary point is a shoulder boundary-side circular arc. Of a contour of the shoulder land surface-forming portion, a contour from the shoulder reference tangent point to the shoulder intermediate boundary point is represented by the shoulder tangent point-side circular arc, and a contour from the shoulder intermediate boundary point to the shoulder reference boundary point is represented by the shoulder boundary-side circular arc. A distance from the shoulder reference virtual point of intersection to the shoulder vertical point is equal to the distance from the reference virtual point of intersection to the vertical point. A distance from the shoulder reference virtual point of intersection to the shoulder horizontal point is equal to the distance from the reference virtual point of intersection to the horizontal point.

Preferably, in the tire mold, the tread includes a cap portion including the tread surface, and an unvulcanized rubber for the cap portion has a Mooney viscosity of not less than 80.

A production method for a tire according to an aspect of the present invention includes the step of pressurizing and heating an unvulcanized tire by using any tire mold described above.

A tire according to an aspect of the present invention is a tire including a tread having a tread surface that comes into contact with a road surface, at least two circumferential grooves being formed on the tread, thereby forming at least three land portions in the tread, the tread surface including the at least two circumferential grooves and at least three land surfaces that are outer surfaces of the at least three land portions. In the tire, a surface that has a contour represented by at least one circular arc and that is tangent to the three land surfaces aligned in an axial direction with the circumferential grooves interposed therebetween is a reference surface of the tread surface. Among the three land surfaces, a land surface located between the two circumferential grooves is a curved land surface. The circumferential grooves each include a reference wall that is a wall on the curved land surface side, and a facing wall that is a wall facing the reference wall. A tangent point between the curved land surface and the reference surface is a reference tangent point. A boundary between the reference wall and the curved land surface is a reference boundary point. A point of intersection of the reference surface and a virtual line of the reference wall that extends from the reference boundary point toward the reference surface is a reference virtual point of intersection. A contour of the curved land surface is represented by one or more circular arcs. The reference boundary point is located inward of the reference surface. When one circumferential groove has a smaller groove cross-sectional area, and the other circumferential groove has a larger groove cross-sectional area, a distance from the reference virtual point of intersection to the reference boundary point on the one circumferential groove side is shorter, and a distance from the reference virtual point of intersection to the reference boundary point on the other circumferential groove side is longer.

With the tire mold and the production method for a tire according to one or more embodiments of the present disclosure, the ground-contact surface shape and the ground-contact pressure distribution of a tire can be made appropriate. In a tire obtained by the tire mold and the production method for a tire, an appropriate ground-contact surface shape and an appropriate ground-contact pressure distribution are obtained, and thus steering stability and wear resistance can be improved.

Turning now to the figures, FIG. 1 shows a part of a pneumatic tire 2 (hereinafter, sometimes referred to simply as "tire 2") according to one or more embodiments of the present disclosure. The tire 2 can be mounted to a passenger car.

FIG. 1 shows a part of a cross-section of the tire 2 along a plane including a rotation axis of the tire 2. In FIG. 1, the right-left direction is the axial direction of the tire 2, and the up-down direction is the radial direction of the tire 2. The direction perpendicular to the surface of the sheet of FIG. 1 is the circumferential direction of the tire 2. In FIG. 1, an alternate long and short dash line CL can represent the equator plane of the tire 2.

The tire 2 can include a tread 4, a pair of sidewalls 6, a pair of clinches 8, a pair of beads 10, a carcass 12, a cord reinforcing layer 14, a pair of chafers 16, an inner liner 18, and a pair of rubber reinforcing layers 20.

The outer surface of the tread 4 can be a tread surface 22. The tread 4 can come into contact with a road surface at the tread surface 22. The tread 4 can have the tread surface 22, which can come into contact with a road surface. The tread 4 can be located outward of the cord reinforcing layer 14 in the radial direction.

The tread 4 can include a base portion 24 and a cap portion 26. The base portion 24 can form a radially inner portion of the tread 4. The base portion 24 can be formed from a crosslinked rubber, for instance, for which heat generation properties are taken into consideration. The cap portion 26 can be located radially outward of the base portion 24. In the tire 2, the cap portion 26 can come into contact with a road surface. The outer surface of the cap portion 26 can be the above-described tread surface 22. The cap portion 26 can be formed from a crosslinked rubber, for instance, for which wear resistance and grip performance are taken into consideration. According to one or more embodiments, the tread 4 may be composed of only the cap portion 26.

Each sidewall 6 can extend from an end of the tread 4 inwardly in the radial direction along the carcass 12. The sidewall 6 can be formed from a crosslinked rubber.

Each clinch 8 can be located radially inward of the sidewall 6. The clinch 8 can come into contact with a rim. The clinch 8 can be formed from a crosslinked rubber, for instance, for which wear resistance is taken into consideration.

Each bead 10 can be located axially inward of the clinch 8. The bead 10 can include a core 28 and an apex 30. The core 28 can include a wire made of steel. The apex 30 can be located radially outward of the core 28. The apex 30 can be formed from a crosslinked rubber that has high stiffness. As shown in FIG. 1, the size of the apex 30 can be smaller than that of a conventional apex, for instance.

The core 28 may include two cores aligned in the axial direction. In this case, a later-described carcass ply may not be turned up around the core 28, but an end portion of the carcass ply can be interposed between these two cores.

The carcass 12 can be located inward of the tread 4, the pair of sidewalls 6, and the pair of clinches 8. The carcass 12 can extend on and between one bead 10 and the other bead 10. The carcass 12 can have a radial structure. The carcass 12 can include at least one carcass ply 32. The carcass 12 of the tire 2 can be composed of one carcass ply 32. The carcass ply 32 can be turned up around the core 28 of each bead 10. The carcass ply 32 can include a relatively large number of cords aligned with each other.

The cord reinforcing layer 14 can include a belt 34 and a band 36. The belt 34 can form an inner portion of the cord reinforcing layer 14, and the band 36 can form an outer portion of the cord reinforcing layer 14. According to one or more embodiments, the cord reinforcing layer 14 may be composed of only the belt 34, or may be composed of only the band 36.

The belt 34 can be laminated on the carcass 12 on the radially inner side of the tread 4. The belt 34 can include at least two belt plies 38 laminated in the radial direction. The belt 34 of the tire 2 can be composed of two belt plies 38. Each of the two belt plies 38 can include a relatively large number of cords aligned with each other. These cords can be inclined relative to the equator plane CL. The material of each cord can be steel, for instance.

The band 36 can be located inward of the tread 4 in the radial direction. The band 36 can be located between the tread 4 and the belt 34 in the radial direction. The band 36 of the tire 2 can include a full band 36f and a pair of edge bands 36e located outward of the full band 36f. According to one or more embodiments, the band 36 may be composed of only the full band 36f, or may be composed of only the pair of edge bands 36e.

The band 36 can include cords. In the full band 36f and the edge bands 36e, the cords can be spirally wound in the circumferential direction. A cord formed from an organic fiber may be used as each cord of the band 36.

Each chafer 16 can be located radially inward of the bead 10. The chafer 16 can come into contact with the rim. The chafer 16 can include a fabric and a rubber with which the fabric is impregnated. According to one or more embodiments, the chafer 16 may be composed of a member formed from a crosslinked rubber.

The inner liner 18 can be located inward of the carcass 12. The inner liner 18 can form an inner surface of the tire 2. The inner liner 18 can be formed from a crosslinked rubber that has relatively low gas permeability.

Each rubber reinforcing layer 20 can be located outward of the apex 30 in the axial direction. The rubber reinforcing layer 20 can be located between the carcass 12 and the clinch 8. The rubber reinforcing layer 20 can be formed from a crosslinked rubber. In the tire 2, the material of the rubber reinforcing layer 20 can be the same as that of the apex 30. In the tire 2, the rubber reinforcing layer 20 may not have to be provided. In this case, an apex having a conventional size may be adopted.

As shown in FIG. 1, grooves 40 can be formed on the tread 4 of the tire 2 (specifically, the cap portion 26). Accordingly, a tread pattern can be formed. Each groove 42 of the tire 2 shown in FIG. 1 can be a part of the grooves 40 which form the tread pattern. The groove 42 can extend in the circumferential direction. The groove 42 can be a circumferential groove. The circumferential groove 42 can have a groove width of not less than 9 mm and not greater than 20 mm, which can be set as appropriate in accordance with the specifications of the tire 2. The circumferential groove 42 can have a groove depth of not less than 5 mm and not greater than 15 mm. The groove width can be represented as the distance from one edge of the groove 40 to the other edge of the groove 40. The groove depth can be represented as the distance from the edge to the bottom. In the case where the edges are rounded, a groove width and a groove depth can be specified based on virtual edges obtained on the assumption that the edges are not rounded.

FIG. 1 shows an example in which a plurality of circumferential grooves 42 formed on the tread 4 can be arranged symmetrically with respect to the equator plane CL. These circumferential grooves 42 may be arranged asymmetrically with respect to the equator plane CL.

At least two circumferential grooves 42 can be formed on the tread 4 of the tire 2. Accordingly, at least three land portions 44 can be formed in the tread 4. In the tire 2, each circumferential groove 42 can be a part of the tread surface 22. The tread surface 22 can include the at least two circumferential grooves 42 and at least three land surfaces 46 that are the outer surfaces of the at least three land portions 44. In the tread surface 22, the at least three land surfaces 46 can be aligned in the axial direction with the circumferential grooves 42 interposed therebetween.

Three circumferential grooves 42 can be formed on the tread 4 shown in FIG. 1. Among the three circumferential grooves 42, the circumferential groove 42 located on each outer side in the axial direction can be referred to or characterized as a shoulder circumferential groove 42s. The circumferential groove 42 located adjacent to the shoulder circumferential groove 42s can be referred to or characterized as a middle circumferential groove 42m. In the tire 2, the middle circumferential groove 42m can be located on the equator. The middle circumferential groove 42m may also be referred to as crown circumferential groove.

In the tire 2, each shoulder circumferential groove 42s can have a depth substantially equal to the groove depth of the middle circumferential groove 42m. In the tire 2, the shoulder circumferential groove 42s may be shallower than the middle circumferential groove 42m, or the middle circumferential groove 42m may be shallower than the shoulder circumferential groove 42s. As for when two circumferential grooves 42 are compared with each other, in the case where a ratio of the groove depth of one circumferential groove 42 to the groove depth of the other circumferential groove 42 is not less than 0.9 and not greater than 1.1, it may be determined that the two circumferential grooves 42 have groove depths substantially equal to each other.

In the tire 2, the three circumferential grooves 42 can be formed on the tread 4 so as to be aligned in the axial direction, thereby forming four land portions 44. Among these land portions 44, the land portion 44 located on each outer side in the axial direction can be referred to or characterized as a shoulder land portion 44s. The land portion 44 located inward of the shoulder land portion 44s in the axial direction can be referred to or characterized as a middle land portion 44m. The middle land portion 44m can be located at a center portion of the tread 4, and thus also may be referred to as crown land portion. In the tire 2, the four land portions 44 formed in the tread 4 can include a pair of middle land portions 44m and a pair of shoulder land portions 44s.

Figure 2:
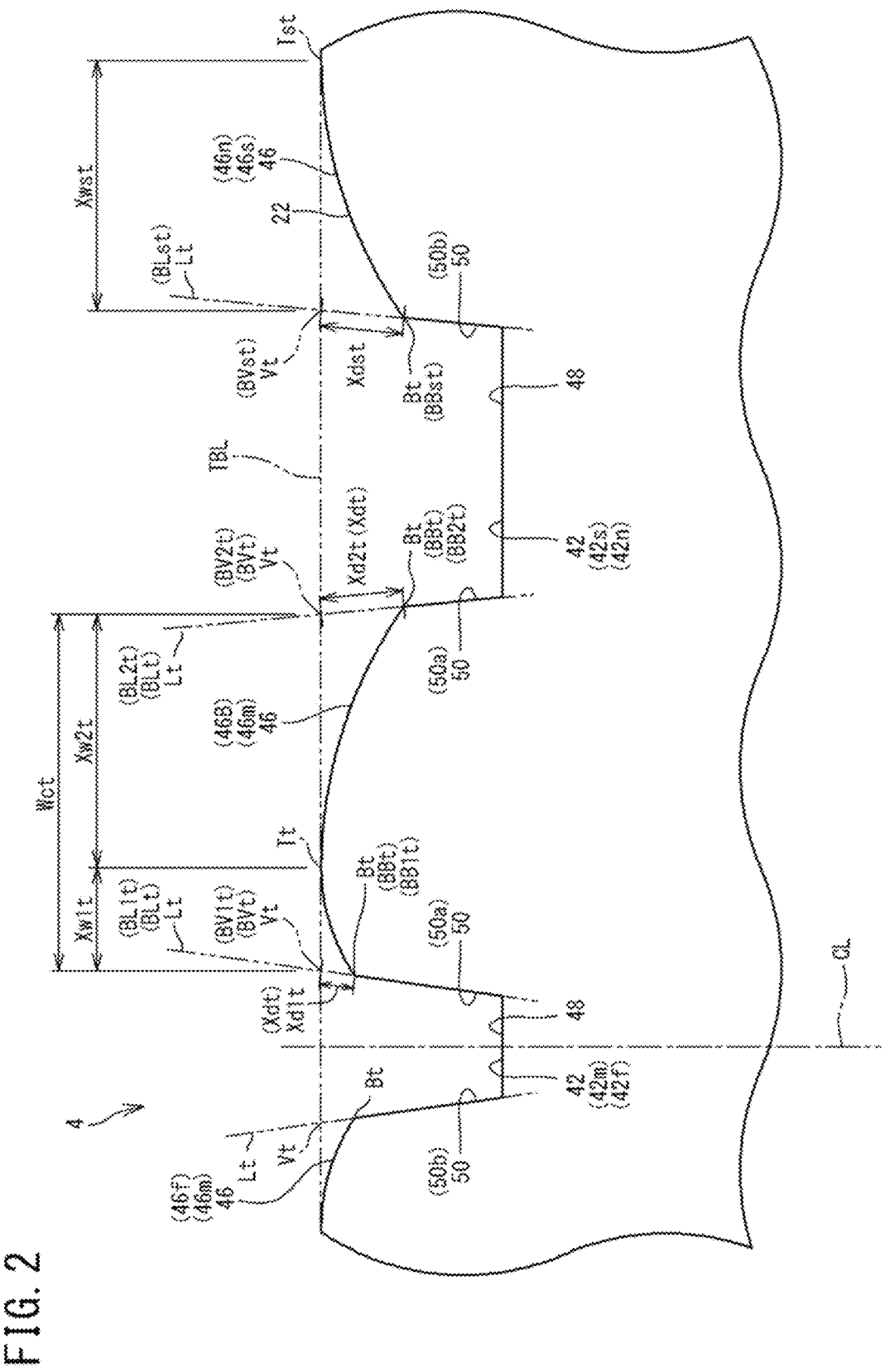
FIG. 2 is an enlarged cross-sectional view showing a part of the tire in FIG. 1.

FIG. 2 shows a part of the tread 4 shown in FIG. 1. In FIG. 2, the right-left direction is the axial direction of the tire 2, and the up-down direction is the radial direction of the tire 2. The direction perpendicular to the surface of the sheet of FIG. 2 is the circumferential direction of the tire 2. In FIG. 2, the contour of the tread surface 22 is schematically represented.

The land portions 44 of the tire 2 can include land portions 44, for instance, each having a land surface 46 having a rounded shape. In FIG. 2, for convenience of description, the rounded shapes of the land surfaces 46 are exaggeratedly represented.

In the tire 2, the shoulder circumferential groove 42s can be present between a land surface 46s (hereinafter, shoulder land surface) of the shoulder land portion 44s and a land surface 46m (hereinafter, middle land surface) of the middle land portion 44m. The circumferential groove 42 between the right and left middle land surfaces 46m can be referred to or characterized as the middle circumferential groove 42m. The land surface 46 located on the left side in the sheet of FIG. 2 can be referred to or characterized as the middle land surface 46m. A middle circumferential groove 42m can be located adjacent to the middle land surface 46m. Another middle land surface 46m can be located adjacent to the middle circumferential groove 42m. A shoulder circumferential groove 42s can be located adjacent to the middle land surface 46m. A shoulder land surface 46s can be located adjacent to the shoulder circumferential groove 42s. That is, three land surfaces 46 can be aligned in the axial direction with the circumferential grooves 42 interposed therebetween.

In FIG. 2, among the three land surfaces 46 aligned in the axial direction with the circumferential grooves 42 interposed therebetween, the land surface 46 located between the two circumferential grooves 42, that is, one middle land surface 46m, can have a shape that is convex outward. This middle land surface 46m may also be referred to as curved land surface 46B. The land surface 46 located adjacent to the curved land surface 46B across the middle circumferential groove 42m, that is, the other middle land surface 46m, may also be referred to as first land surface 46f In this case, the middle circumferential groove 42m may also be referred to as first circumferential groove 42f. The land surface 46 located adjacent to the curved land surface 46B across the shoulder circumferential groove 42s, that is, the shoulder land surface 46s, may also be referred to as second land surface 46n. In this case, the shoulder circumferential groove 42s may also be referred to as second circumferential groove 42n.

In the tire 2, a groove cross-sectional area of the first circumferential groove 42f can be smaller than a groove cross-sectional area of the second circumferential groove 42n. The first circumferential groove 42f can have a smaller groove cross-sectional area, and the second circumferential groove 42n can have a larger groove cross-sectional area. In the tire 2, the groove cross-sectional area of the first circumferential groove 42f may be larger than the groove cross-sectional area of the second circumferential groove 42n, or the groove cross-sectional area of the first circumferential groove 42f may be equal to the groove cross-sectional area of the second circumferential groove 42n.

In the tire 2, regarding two circumferential grooves 42 adjacent to each other, when a ratio of a groove cross-sectional area of one circumferential groove 42 to a groove cross-sectional area of the other circumferential groove 42 is not less than 0.95 and not greater than 1.05, it may be determined that the two circumferential grooves 42 adjacent to each other have groove cross-sectional areas substantially equal to each other. The method for obtaining the groove cross-sectional area will be described later.

In FIG. 2, an alternate long and two short dashes line TBL can represent a reference surface of the tread surface 22. The reference surface TBL of the tread surface 22 can represent a virtual tread surface obtained on the assumption that the grooves 40 are not present on the tread 4. In the tire 2, a surface that has a contour represented by at least one circular arc and that is tangent to the three land surfaces 46 aligned in the axial direction with the circumferential grooves 42 interposed therebetween can be the reference surface TBL of the tread surface 22. In FIG. 2, the reference surface TBL of the tread surface 22 can be tangent to the first land surface 46f, the curved land surface 46B, and the second land surface 46n.

In the case where the contour of the reference surface TBL is represented by a plurality of circular arcs aligned in the axial direction, the contour of the reference surface TBL can be formed such that: one circular arc and another circular arc located adjacent to the one circular arc are tangent to each other at the boundary between both circular arcs; and a circular arc located on the inner side in the axial direction has a radius larger than that of the circular arc located on the outer side. In this case, one circular arc and another circular arc may be connected by a straight line that is tangent to both circular arcs.

A state where the tire 2 is fitted on the normal rim, the internal pressure of the tire 2 is adjusted to 5% of the normal internal pressure, and no load is applied to the tire 2 can be referred to or characterized as a reference state. The contour of the tread surface 22 of the tire 2 can be represented by the contour of the tread surface 22 in the reference state, or the contour of a tread-forming surface of a later-described mold. In the case where the contour configuration of the tread surface 22 is not clear, the contour of the reference surface TBL of the tread surface 22 may be specified, for example, based on a contour of the tread surface 22 that can be obtained by analyzing cross-section image data of the tire 2 in the reference state taken by a computer tomography method using X-rays (hereinafter, X-ray CT method) or shape data of the tread surface 22 of the tire 2 in the reference state measured using a profile measuring device (not shown) having a laser displacement meter. In this case, the contour of the reference surface TBL of the tread surface 22 may be represented by a single circular arc that is tangent to the three land surfaces 46 aligned in the axial direction.

Each circumferential groove 42 can include a bottom 48 and a pair of walls 50. In FIG. 2, reference character Bt can represent the boundary between the wall 50 and the land surface 46. The boundary Bt may also be referred to as boundary point. An alternate long and two short dashes line Lt may be a straight line that extends from the boundary point Bt toward the reference surface TBL and that can be tangent to the contour line of the wall 50 at the boundary point Bt. The straight line Lt may be a virtual line of the wall 50. Reference character Vt may represent the point of intersection of the virtual line Lt and the reference surface TBL. The point of intersection Vt may also be referred to as virtual point of intersection.

In the tire 2, a groove cross-sectional area of each circumferential groove 42 may be represented by the area of a region surrounded by one wall 50, the bottom 48, the other wall 50, the virtual line Lt of the other wall 50, the reference surface TBL, and the virtual line Lt of the one wall 50.

As described above, the curved land surface 46B can be located between the two circumferential grooves 42. In each circumferential groove 42 located adjacent to the curved land surface 46B, the wall 50 located on the curved land surface 46B side may also be referred to as reference wall 50a. The wall 50 facing the reference wall 50a may also be referred to as facing wall 50b. Each circumferential groove 42 located adjacent to the curved land surface 46B can include a reference wall 50a which can be the wall 50 on the curved land surface 46B side, and a facing wall 50b which can be the wall 50 facing the reference wall 50a.

In FIG. 2, reference character BB1t can represent the boundary between the reference wall 50a (hereinafter, first reference wall) of the first circumferential groove 42f and the curved land surface 46B. The boundary BB1t may be a reference boundary point (hereinafter, first reference boundary point). An alternate long and two short dashes line BL1t can be a virtual line of the first reference wall 50a. Reference character BV1t may represent a virtual point of intersection represented as the point of intersection of the virtual line BL1t of the first reference wall 50a and the reference surface TBL. The virtual point of intersection BV1t can be a reference virtual point of intersection (hereinafter, first reference virtual point of intersection). A double-headed arrow Xd1t can represent the distance from the first reference virtual point of intersection BV1t to the first reference boundary point BB1t. The distance Xd1t can be measured along the virtual line BL1t of the first reference wall 50a.

In FIG. 2, reference character BB2t can represent the boundary between the reference wall 50a (hereinafter, second reference wall) of the second circumferential groove 42n and the curved land surface 46B. The boundary BB2t may be a reference boundary point (hereinafter, second reference boundary point). An alternate long and two short dashes line BL2t can be a virtual line of the second reference wall 50a. Reference character BV2t can indicate a virtual point of intersection represented as the point of intersection of the virtual line BL2t of the second reference wall 50a and the reference surface TBL. The virtual point of intersection BV2t can be a reference virtual point of intersection (hereinafter, second reference virtual point of intersection). A double-headed arrow Xd2t can represent the distance from the second reference virtual point of intersection BV2t to the second reference boundary point BB2t. The distance Xd2t can be measured along the virtual line BL2t of the second reference wall 50a.

The tire 2 described above can be produced as follows. Although not described in detail, a rubber composition in an unvulcanized state (hereinafter, also referred to as an unvulcanized rubber) for components included in the tire 2 such as the tread 4, the sidewalls 6, and the beads 10 can be prepared in the production of the tire 2. The unvulcanized rubber can be obtained by mixing a base rubber and chemicals using a kneading machine such as a Banbury mixer.

Examples of the base rubber include natural rubber (NR), butadiene rubber (BR), styrene-butadiene rubber (SBR), isoprene rubber (IR), ethylene-propylene rubber (EPDM), chloroprene rubber (CR), acrylonitrile-butadiene rubber (NBR), and isobutylene-isoprene-rubber (IIR). Examples of the chemicals include reinforcing agents such as carbon black and silica, plasticizers such as aromatic oil, fillers such as zinc oxide, lubricants such as stearic acid, antioxidants, processing aids, sulfur, and vulcanization accelerators. Although not described in detail, selection of a base rubber and chemicals, the amounts of the selected chemicals, etc., can be determined as appropriate in accordance with the specifications of a component for which the rubber is used.

In the production of the tire 2, in a rubber molding machine such as an extruder, the shape of the unvulcanized rubber can be adjusted to prepare preforms for tire components. In a tire building machine, the preforms for the tread 4, the sidewalls 6, the bead 10, etc., can be combined to prepare the tire 2 in an unvulcanized state (hereinafter, also referred to as unvulcanized tire).

In the production of the tire 2, the unvulcanized tire can be put into a mold of a vulcanizing machine. The unvulcanized tire can be pressurized and heated within the mold to obtain the tire 2. The tire 2 can be a vulcanized-molded product of the unvulcanized tire.

The production method for the tire 2 can include a step of preparing an unvulcanized tire, and a step of pressurizing and heating the unvulcanized tire using a mold. Although not described in detail, in the production of the tire 2, the vulcanization conditions such as temperature, pressure, and time are not particularly limited, and general vulcanization conditions can be adopted.

Figure 3:
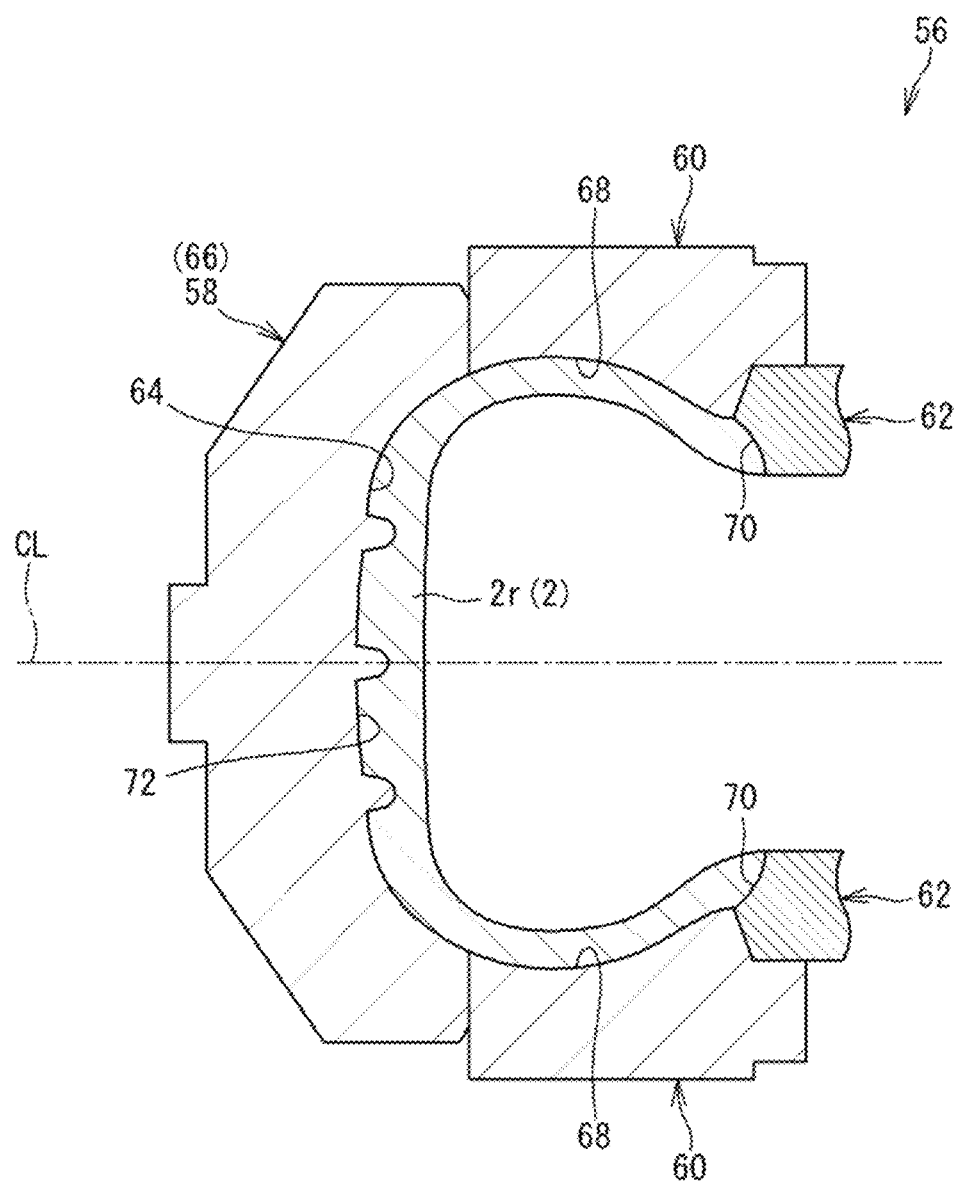
FIG. 3 is a cross-sectional view showing a part of a tire mold according to one or more embodiments of the present disclosure.

FIG. 3 shows a part of a cross-section of a tire mold 56 along a plane including the rotation axis of the tire 2. The mold 56 can be used for producing the tire 2 shown in FIG. 1. In FIG. 3, the right-left direction is the radial direction of the tire 2, and the up-down direction is the axial direction of the tire 2. The direction perpendicular to the surface of the sheet of FIG. 3 is the circumferential direction of the tire 2.

An alternate long and short dash line CL can represent the equator plane of the tire 2. For convenience of description, the dimensions of the mold 56 are represented below based on the dimensions of the tire 2.

The mold 56 can include a tread ring 58, a pair of side plates 60, and a pair of bead rings 62. The mold 56 can be a segmented mold. In FIG. 3, the mold 56 can be in a state where the tread ring 58, the pair of side plates 60, and the pair of bead rings 62 are combined, that is, in a closed state.

The tread ring 58 can form a radially outer portion of the mold 56. The tread ring 58 can have a tread-forming surface 64 in the inner surface thereof. The tread-forming surface 64 can shape the tread surface 22 of the tire 2 in the outer surface of an unvulcanized tire 2r. The tread ring 58 of the mold 56 can include a large number of segments 66. These segments 66 can be arranged in a ring shape.

Each side plate 60 can be located radially inward of the tread ring 58. The side plate 60 can be connected to an end of the tread ring 58. The side plate 60 can have a sidewall-forming surface 68 in the inner surface thereof. The sidewall-forming surface 68 can shape a side surface of the tire 2 in the outer surface of the unvulcanized tire 2r.

Each bead ring 62 can be located radially inward of the side plate 60. The bead ring 62 can be connected to an end of the side plate 60. The bead ring 62 can have a bead-forming surface 70 in the inner surface thereof. The bead-forming surface 70 can shape a bead 10 portion of the tire 2, specifically, a portion to be fitted to the rim, in the outer surface of the unvulcanized tire 2r.

In the mold 56, a cavity face 72 for shaping the outer surface of the tire 2 can be formed by combining the large number of segments 66, the pair of side plates 60, and the pair of bead rings 62. The cavity face 72 can include the tread-forming surface 64, a pair of the sidewall-forming surfaces 68, and a pair of the bead-forming surfaces 70.

In the pressurizing and heating step, the unvulcanized tire 2r can be pressed against the cavity face 72 of the mold 56 by a rigid core or an expanded bladder. Accordingly, the outer surface of the tire 2 can be shaped.

Figure 4:
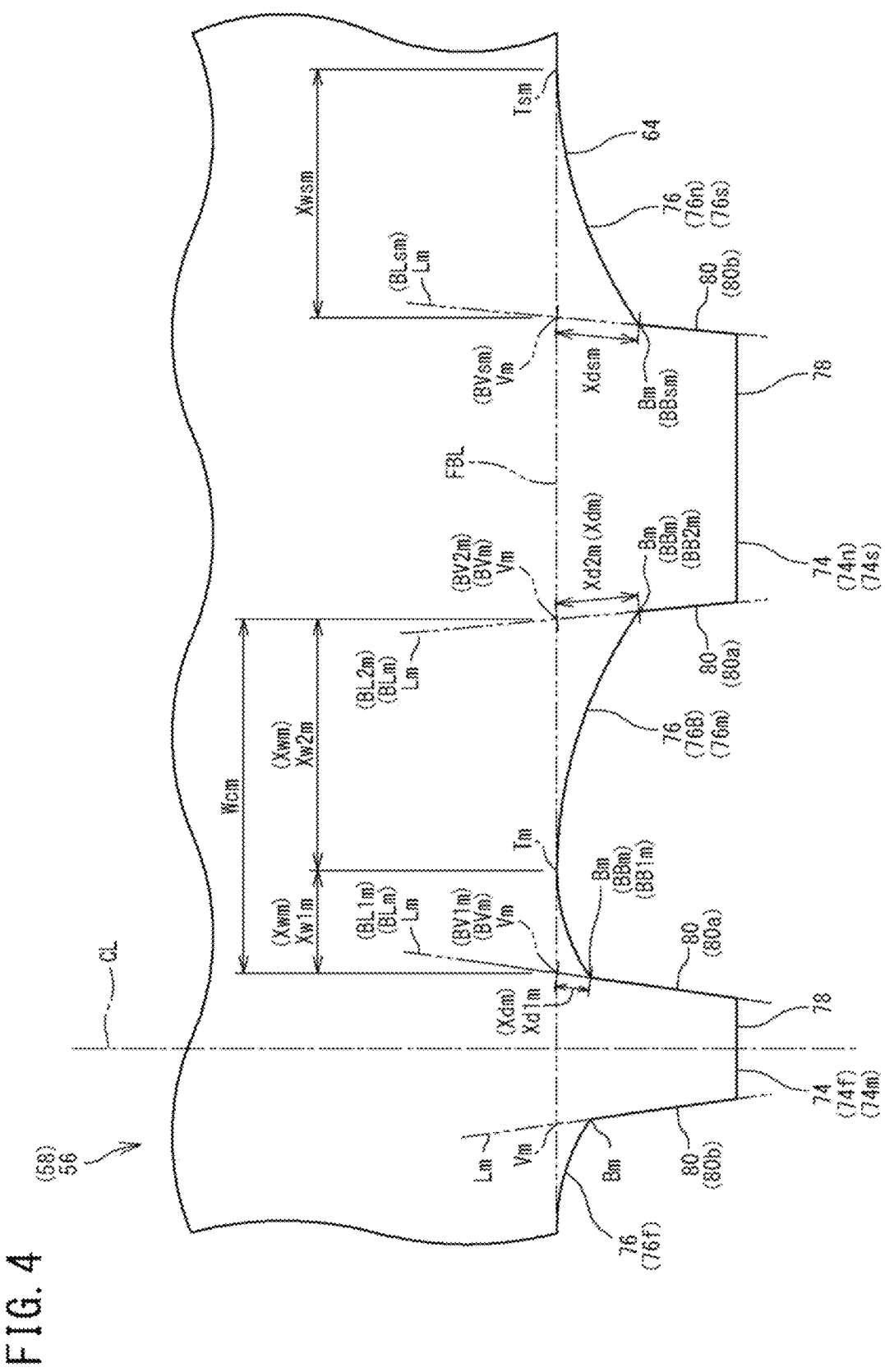
FIG. 4 is an enlarged cross-sectional view showing a part of the mold in FIG. 3.

FIG. 4 shows a cross-section of the tread ring 58 which can form a part of the mold 56 shown in FIG. 3. In FIG. 4, the contour of the tread-forming surface 64 for shaping the tread surface 22 is schematically represented. In FIG. 4, the right-left direction is the axial radial direction of the tire 2, and the up-down direction is the radial direction of the tire 2. The direction perpendicular to the surface of the sheet of FIG. 4 is the circumferential direction of the tire 2.

As described above, the tread surface 22 of the tire 2 can include the at least two circumferential grooves 42 and the at least three land surfaces 46, which can be the outer surfaces of the at least three land portions 44. Therefore, in the mold 56, the tread-forming surface 64 for shaping the tread surface 22 can include at least two projections 74 for forming the at least two circumferential grooves 42, and at least three land surface-forming portions 76 for forming the at least three land surfaces 46.

In the mold 56, of the at least two projections 74, the projection 74 for shaping the first circumferential groove 42f can be a first projection 74f. The projection 74 for shaping the second circumferential groove 42n can be a second projection 74n.

As described above, in the mold 56, the groove cross-sectional area of the first circumferential groove 42f can be smaller than the groove cross-sectional area of the second circumferential groove 42n. A cross-sectional area of the first projection 74f can be smaller than a cross-sectional area of the second projection 74n. The first projection 74f can have a smaller cross-sectional area, and the second projection 74n can have a larger cross-sectional area.

In the mold 56, of the at least three land surface-forming portions 76, the land surface-forming portion 76 for shaping the curved land surface 46B can be a curved land surface-forming portion 76B. The land surface-forming portion 76 for shaping the first land surface 46f can be a first land surface-forming portion 76f. The land surface-forming portion 76 for shaping the second land surface 46n can be a second land surface-forming portion 76n.

On the sheet of FIG. 4, the first projection 74f can be located adjacent to the first land surface-forming portion 76f. The curved land surface-forming portion 76B can be located adjacent to the first projection 74f. The second projection 74n can be located adjacent to the curved land surface-forming portion 76B. The second land surface-forming portion 76n can be located adjacent to the second projection 74n. That is, the three land surface-forming portions 76 can be aligned in the axial direction with the projections 74 interposed therebetween. Of the three land surface-forming portions 76, the land surface-forming portion 76 located between the two projections 74 can be the curved land surface-forming portion 76B. The two land surface-forming portions 76 located adjacent to the curved land surface-forming portion 76B can be the first land surface-forming portion 76f and the second land surface-forming portion 76n.

Of the land surface-forming portions 76 included in the tread-forming surface 64, the land surface-forming portion 76 located on the outer side in the axial direction can be a shoulder land surface-forming portion 76s for shaping the shoulder land surface 46s. In the mold 56, of the above-described three land surface-forming portions 76 which are aligned in the axial direction with the projections 74 interposed therebetween, the curved land surface-forming portion 76B can be a middle land surface-forming portion 76m for shaping one middle land surface 46m. The first land surface-forming portion 76f located adjacent to the curved land surface-forming portion 76B can be a middle land surface-forming portion 76m for shaping the other middle land surface 46m. The first projection 74f located between the first land surface-forming portion 76f and the curved land surface-forming portion 76B can be a middle projection 74m for shaping the middle circumferential groove 42m. The second land surface-forming portion 76n located adjacent to the curved land surface-forming portion 76B can be the shoulder land surface-forming portion 76s. The second projection 74n located between the second land surface-forming portion 76n and the curved land surface-forming portion 76B can be a shoulder projection 74s for shaping the shoulder circumferential groove 42s.

In FIG. 4, an alternate long and two short dashes line FBL can represent a reference forming surface of the tread-forming surface 64. The reference forming surface FBL of the tread-forming surface 64 can correspond to the above-described reference surface TBL of the tread surface 22. In the mold 56, a surface that has a contour represented by at least one circular arc and that is tangent to the three land surface-forming portions 76 which can be aligned in the axial direction with the projections 74 interposed therebetween can be the reference forming surface FBL of the tread-forming surface 64. In FIG. 4, the reference forming surface FBL of the tread-forming surface 64 can be tangent to the first land surface-forming portion 76f, the curved land surface-forming portion 76B, and the second land surface-forming portion 76n from the left side of the sheet of FIG. 4.

In the case where the contour of the reference forming surface FBL is represented by a plurality of circular arcs aligned in the axial direction, the contour of the reference forming surface FBL can be formed such that: one circular arc and another circular arc located adjacent to the one circular arc can be tangent to each other at the boundary between both circular arcs; and a circular arc located on the inner side in the axial direction can have a radius larger than that of the circular arc located on the outer side.

Each projection 74 can include a top surface 78 and a pair of side surfaces 80. In FIG. 4, reference character Bm can represent the boundary between the side surface 80 and the land surface-forming portion 76. The boundary Bm may also be referred to as boundary point. An alternate long and two short dashes line Lm can be a straight line that extends from the boundary point Bm toward the reference forming surface FBL and that can be tangent to the contour line of the side surface 80 at the boundary point Bm. The straight line Lm may be a virtual line of the side surface 80. Reference character Vm can represent the point of intersection of the virtual line Lm and the reference forming surface FBL. The point of intersection Vm may also be referred to as virtual point of intersection.

In the mold 56, a cross-sectional area of the projection 74 can be represented as the area of a region surrounded by one side surface 80, the top surface 78, the other side surface 80, the virtual line Lm of the other side surface 80, the reference forming surface FBL, and the virtual line Lm of the one side surface 80.

As described above, the curved land surface-forming portion 76B can be located between the two projections 74. In each projection 74 located adjacent to the curved land surface-forming portion 76B, the side surface 80 located on the curved land surface-forming portion 76B side may also be referred to as reference side surface 80a. The side surface 80 located on the back side of the reference side surface 80a may also be referred as back side surface 80b. Each projection 74 located adjacent to the curved land surface-forming portion 76B can include a reference side surface 80a, which can be the side surface 80 on the curved land surface-forming portion 76B side, and a back side surface 80b, which can be the side surface 80 located on the back side of the reference side surface 80a.

In FIG. 4, reference character BB1m can represent the boundary between the reference side surface 80a (hereinafter, first reference side surface) of the first projection 74f and the curved land surface-forming portion 76B. The boundary BB1m can be a reference boundary point (hereinafter, first reference boundary point). An alternate long and two short dashes line BL1m can be a virtual line of the first reference side surface 80a. Reference character BV1m can represent a virtual point of intersection represented as the point of intersection of the virtual line BL1m of the first reference side surface 80a and the reference forming surface FBL. The virtual point of intersection BV1m can be a reference virtual point of intersection (hereinafter, first reference virtual point of intersection). A double-headed arrow Xd1m can represent the distance from the first reference virtual point of intersection BV1m to the first reference boundary point BB1m. The distance Xd1m can be measured along the virtual line BL1m of the first reference side surface 80a.

In FIG. 4, reference character BB2m can represent the boundary between the reference side surface 80a (hereinafter, second reference side surface) of the second projection 74n and the curved land surface-forming portion 76B. The boundary BB2m can be a reference boundary point (hereinafter, second reference boundary point). An alternate long and two short dashes line BL2m can be a virtual line of the second reference side surface 80a. Reference character BV2m can represent a virtual point of intersection represented as the point of intersection of the virtual line BL2m of the second reference side surface 80a and the reference forming surface FBL. The virtual point of intersection BV2m can be a reference virtual point of intersection (hereinafter, second reference virtual point of intersection). A double-headed arrow Xd2m can represent the distance from the second reference virtual point of intersection BV2m to the second reference boundary point BB2m. The distance Xd2m can be measured along the virtual line BL2m of the second reference side surface 80a.

In the mold 56, the flow of the unvulcanized rubber that is generated by pressing the projections 74 against the unvulcanized tire 2r can be controlled based on the shapes of the land surface-forming portions 76. As described above, the circumferential grooves 42 can be formed on the cap portion 26 of the tread 4. The projections 74 on the tread-forming surface 64 can press the cap portion 26. In the mold 56, the flow of the unvulcanized rubber, for the cap portion 26, generated by pressing the projections 74 against the unvulcanized tire 2r can be controlled based on the shapes of the land surface-forming portions 76. Hereinafter, the shapes of the land surface-forming portions 76 will be described.

[Contour of Curved Land Surface-Forming Portion 76B]

The contour of the curved land surface-forming portion 76B located between the two projections 74 will be described. As described above, the reference forming surface FBL of the tread-forming surface 64 can be tangent to the first land surface-forming portion 76f, the curved land surface-forming portion 76B, and the second land surface-forming portion 76n which can be included in the tread-forming surface 64. In FIG. 4, reference character Tm can represent the tangent point between the curved land surface-forming portion 76B and the reference forming surface FBL. In the mold 56, the tangent point Tm can be a reference tangent point.

In the mold 56, the contour of the curved land surface-forming portion 76B can be represented by one or more circular arcs. The above-described first reference boundary point BB1m may also be the end on the first projection 74f side of the curved land surface-forming portion 76B. The above-described second reference boundary point BB2m may also be the end on the second projection 74n side of the curved land surface-forming portion 76B. As shown in FIG. 4, the end BB1m on the first projection 74f side of the curved land surface-forming portion 76B can be located inward of the reference forming surface FBL of the tread-forming surface 64 in the radial direction. The end BB2m on the second projection 74n side of the curved land surface-forming portion 76B can also be located inward of the reference forming surface FBL in the radial direction.

In the production of the tire 2, by the cap portion 26 being pressed by the projections 74, the unvulcanized rubber for the cap portion 26 can flow toward the portion between the two projections 74, that is, the curved land surface-forming portion 76B. In the mold 56, the contour of the curved land surface-forming portion 76B can be formed such that the ends BB1m and BB2m of the curved land surface-forming portion 76B can be located inward of the reference forming surface FBL. The volume of the unvulcanized rubber that flows to the curved land surface-forming portion 76B may be limited, and thus disturbance can be inhibited from occurring in the flow of the unvulcanized rubber pressed by the projections 74.

In the mold 56, as described above, the first projection 74f can have a smaller cross-sectional area, and the second projection 74n can have a larger groove cross-sectional area. The volume of the unvulcanized rubber pressed by the second projection 74n can be larger than the volume of the unvulcanized rubber pressed by the first projection 74f There may be a concern that a difference may occur between the flow of the unvulcanized rubber on the first projection 74f side and the flow of the unvulcanized rubber on the second projection 74n side.

However, in the mold 56, the distance Xd2m from the second reference virtual point of intersection BV2m to the second reference boundary point BB2m on the second projection 74n side can be longer than the distance Xd1m from the first reference virtual point of intersection BV1m to the first reference boundary point BB1m on the first projection 74f side. In other words, the distance Xd1m from the first reference virtual point of intersection BV1m to the first reference boundary point BB1m on the first projection 74f side can be shorter, and the distance Xd2m from the second reference virtual point of intersection BV2m to the second reference boundary point BB2m on the second projection 74n side can be longer. In the mold 56, the volume of the unvulcanized rubber that flows to the curved land surface-forming portion 76B can be effectively limited on the second projection 74n side having a larger cross-sectional area. The flow of the unvulcanized rubber on the first projection 74f side and the flow of the unvulcanized rubber on the second projection 74n side can be controlled in a well-balanced manner, and thus disturbance may be less likely to occur in the flow of the unvulcanized rubber. With the mold 56, the curved land surface 46B in which the shape of the curved land surface-forming portion 76B is reflected can be formed. Since disturbance of the inner surface shape of the tread 4 may also inhibited, the inner surface of the tread 4 can be formed in an appropriate shape.

Figure 5:
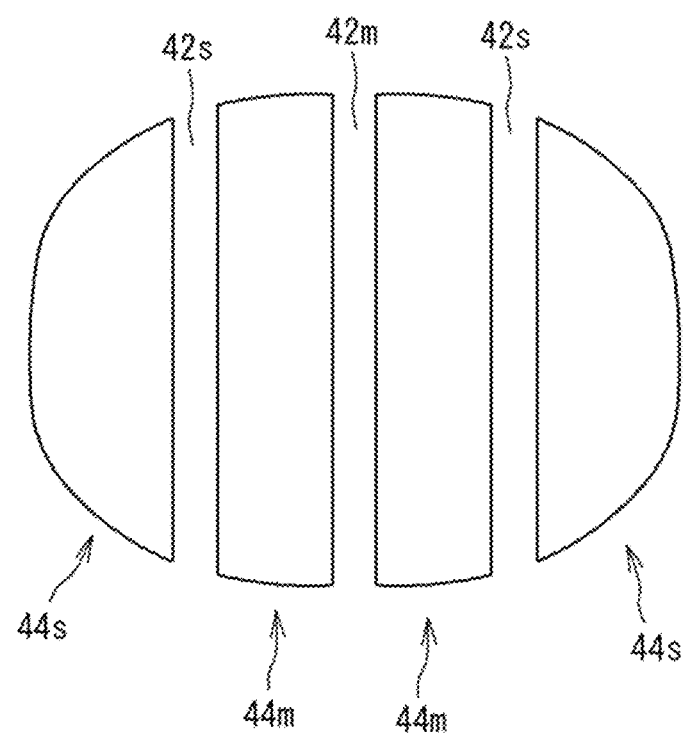
FIG. 5 is a schematic diagram showing an example of a ground-contact surface shape of a tire produced by a mold having the configuration shown in FIG. 4.

FIG. 5 shows an example of a ground-contact surface shape of the tire 2 (size=205/55R16) produced using the mold 56. In FIG. 5, the right-left direction corresponds to the axial direction of the tire 2. The up-down direction corresponds to the circumferential direction of the tire 2.

The ground-contact surface shape can be obtained by tracing the contour of each land portion 44 on a ground-contact surface obtained by applying a load equal to the normal load to the tire 2 in the normal state and pressing the tire 2 against a road surface, using a tire ground-contact shape measuring device. To obtain the ground-contact surface, the tire 2 can be placed such that the axial direction thereof is parallel to the road surface, and the above load can be applied to the tire 2 in a direction perpendicular to the road surface. In the measuring device, the road surface can be formed as a flat surface. In the measurement of the ground-contact surface, the tire 2 can be pressed against the flat road surface. The ground-contact surface shape, shown in FIG. 9, of the tire produced by the conventional mold may also be obtained in the same manner.

As shown in FIG. 5, in the ground-contact surface shape of the tire 2 produced by the mold 56, the outer edge in the circumferential direction of the middle land portion 44m located between each shoulder circumferential groove 42s and the middle circumferential groove 42m may not have a shape that is convex inward as in the outer edge in the circumferential direction of each middle land portion confirmed for the tire produced by the conventional mold and shown in FIG. 9, but can have a shape that bulges outward. The area of the ground-contact surface can be clearly increased, so that the tire 2 can more sufficiently come into contact with a road surface than the tire produced by the conventional mold. With the mold 56, the steering stability of the tire 2 can be further improved.

Figure 6:
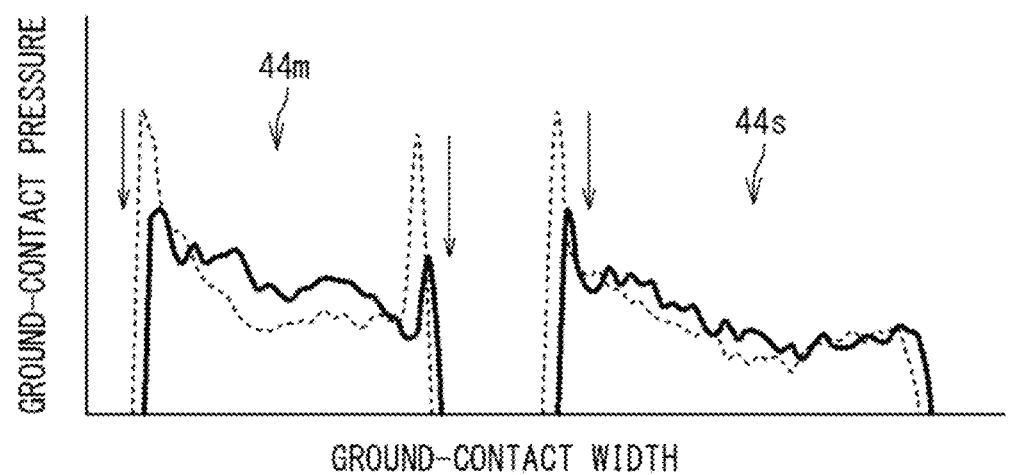
FIG. 6 is a graph showing an example of a ground-contact pressure distribution of the tire produced by the mold having the configuration shown in FIG. 4.

FIG. 6 shows an example of a ground-contact pressure distribution of the tire 2 (size=205/55R16) produced using the mold 56. The vertical axis represents ground-contact pressure, and the horizontal axis represents a position in the ground-contact width direction of the ground-contact surface. In FIG. 6, the left side shows a ground-contact pressure distribution of the middle land portion 44m, and the right side shows a ground-contact pressure distribution of the shoulder land portion 44s.

The ground-contact pressure distribution can be obtained by applying a load equal to the normal load to the tire 2 in the normal state and pressing the tire 2 against a road surface, using a tire ground-contact pressure measuring device. To obtain the ground-contact pressure distribution, the tire 2 can be placed such that the axial direction thereof is parallel to the road surface, and the above load can be applied to the tire 2 in a direction perpendicular to the road surface. In the measuring device, the road surface can be formed as a flat surface. In the measurement of the ground-contact pressure distribution, the tire 2 can be pressed against the flat road surface. A ground-contact pressure distribution, for instance, shown in FIG. 10, of the tire produced by the conventional mold may also be obtained in the same manner. In FIG. 6, the ground-contact pressure distribution indicated by a dotted line may be representative of the ground-contact pressure distribution of the tire produced by the conventional mold.

As shown in FIG. 6, in the ground-contact pressure distribution of the tire 2 produced by the mold 56, the increase in ground-contact pressure at each edge of the middle land portion 44m can be suppressed as compared to the increase in ground-contact pressure at each edge of the middle land portion confirmed for the tire produced by the conventional mold, for instance, as shown in FIG. 10. In the example shown in FIG. 6, the ground-contact pressure difference in the middle land portion 44m can be reduced to about 55 kPa, for instance. The local increase in ground-contact pressure can be clearly suppressed, so that the wear resistance of the tire 2 can be further improved with the mold 56.

With the mold 56 and the production method for the tire 2 using the mold 56, the ground-contact surface shape and the ground-contact pressure distribution of the tire 2 can be made appropriate, so that improvement of the steering stability and the wear resistance of the tire 2 can be achieved.

In FIG. 4, a double-headed arrow Wcm can represent the distance from the first reference virtual point of intersection BV1m to the second reference virtual point of intersection BV2m. The distance Wcm may be represented as the length of a line segment connecting the first reference virtual point of intersection BV1m and the second reference virtual point of intersection BV2m. A double-headed arrow Xw1m can represent the distance from the first reference virtual point of intersection BV1m to the reference tangent point Tm. The distance Xw1m may be represented as the length of a line segment connecting the first reference virtual point of intersection BV1m and the reference tangent point Tm. A double-headed arrow Xw2m can represent the distance from the second reference virtual point of intersection BV2m to the reference tangent point Tm. The distance Xw2m may be represented as the length of a line segment connecting the second reference virtual point of intersection BV2m and the reference tangent point Tm.

In the mold 56, the position of the reference tangent point Tm, which can be the tangent point between the curved land surface-forming portion 76B and the reference forming surface FBL, can be determined based on the cross-sectional areas of the projections 74 located on both sides of the curved land surface-forming portion 76B. Specifically, when the cross-sectional area of the first projection 74$f$ is denoted by Sam, and the cross-sectional area of the second projection 74$n$ is denoted by Sbm, for instance, the distance Xw1$m$ can be set such that the following formula (1) represented by using the distance Xw1$m$, the distance Wcm, the cross-sectional area Sam, and the cross-sectional area Sbm can be satisfied.

$$Sam/(Sam+Sbm) \times 100-10 \leq Xw1m/Wcm \times 100 \leq Sam/(Sam+Sbm) \times 100+10 \quad (1)$$

In the mold 56, since the cross-sectional area Sam of the first projection 74$f$ can be smaller than the cross-sectional area Sbm of the second projection 74$n$, the reference tangent point Tm can be set on the first reference boundary point BB1$m$ side. In the mold 56, the flow of the unvulcanized rubber to the first projection 74$f$ side having a smaller cross-sectional area can be promoted. In the mold 56, in the case where the cross-sectional area Sam of the first projection 74$f$ is larger than the cross-sectional area Sbm of the second projection 74$n$, the reference tangent point Tm can be set on the second reference boundary point BB2$m$ side. In this case, the flow of the unvulcanized rubber to the second projection 74$n$ side can be promoted.

In the mold 56, the flow of the unvulcanized rubber on the first projection 74$f$ side and the flow of the unvulcanized rubber on the second projection 74$n$ side can be controlled in a well-balanced manner. Since disturbance may be less likely to occur in the flow of the unvulcanized rubber, the curved land surface 46B in which the shape of the curved land surface-forming portion 76B is reflected can be formed. With the mold 56 and the production method for the tire 2 using the mold 56, the ground-contact surface shape and the ground-contact pressure distribution of the tire 2 can be made appropriate, so that improvement of the steering stability and the wear resistance of the tire 2 can be achieved.

In the mold 56, when the cross-sectional area of each projection 74 located adjacent to the curved land surface-forming portion 76B is denoted by Sm, the ratio (Xdm/Sm) of a distance Xdm from a reference virtual point of intersection BVm to a reference boundary point BBm to the cross-sectional area Sm of the projection 74 may be not less than 0.0008 and may be not greater than 0.0040.

When the ratio (Xdm/Sm) is set so as to be not less than 0.0008, the shape of the curved land surface-forming portion 76B can effectively contribute to limiting the flow of the unvulcanized rubber pressed by the projection 74. Even when there is a difference between the cross-sectional areas of the projections 74 located on both sides of the curved land surface-forming portion 76B, disturbance may be less likely to occur in the flow of the unvulcanized rubber. With the mold 56, the curved land surface 46B in which the shape of the curved land surface-forming portion 76B is reflected can be formed. From this viewpoint, the ratio (Xdm/Sm) can be not less than 0.0014, for instance, not less than 0.0020.

When the ratio (Xdm/Sm) is set so as to be not greater than 0.0040, the flow of the unvulcanized rubber pressed by the projection 74 can be appropriately maintained. In this case as well, even when there is a difference between the cross-sectional areas of the projections 74 located on both sides of the curved land surface-forming portion 76B, disturbance may be less likely to occur in the flow of the unvulcanized rubber. With the mold 56, the curved land surface 46B in which the shape of the curved land surface-forming portion 76B is reflected can be formed. From this viewpoint, the ratio (Xdm/Sm) can be not greater than 0.0034, for instance, not greater than 0.0028.

As described above, in the mold 56, the cross-sectional area Sam of the first projection 74$f$ can be smaller than the cross-sectional area Sbm of the second projection 74$n$. In the case where the cross-sectional area Sam of the first projection 74$f$ and the cross-sectional area Sbm of the second projection 74$n$ are different from each other, from the viewpoint that the flow of the unvulcanized rubber on the first projection 74$f$ side and the flow of the unvulcanized rubber on the second projection 74$n$ side can be controlled in a well-balanced manner and disturbance can be effectively inhibited from occurring in the flow of the unvulcanized rubber, the ratio (Xd1$m$/Sam) of the distance Xd1$m$ from the first reference virtual point of intersection BV1$m$ to the first reference boundary point BB1$m$ to the cross-sectional area Sam of the first projection 74$f$ on the first projection 74$f$ side can be not less than 0.0008 and can be not greater than 0.0040, and the ratio (Xd2$m$/Sbm) of the distance Xd2$m$ from the second reference virtual point of intersection BV2$m$ to the second reference boundary point BB2$m$ to the cross-sectional area Sbm of the second projection 74$n$ on the second projection 74$n$ side can be not less than 0.0008 and can be not greater than 0.0040. In this case, the ratio (Xd1$m$/Sam) and the ratio (Xd2$m$/Sbm) can be set to the same value.

As described above, the contour of the curved land surface-forming portion 76B may be represented by one or more circular arcs. The contour of the curved land surface-forming portion 76B can be represented by a circular arc that passes through the reference boundary point BBm and that is tangent to the reference forming surface FBL at the reference tangent point Tm. Specifically, the contour of the curved land surface-forming portion 76B can be represented by a circular arc that passes through the first reference boundary point BB1$m$ and that is tangent to the reference forming surface FBL at the reference tangent point Tm, and a circular arc that passes through the second reference boundary point BB2$m$ and that is tangent to the reference forming surface FBL at the reference tangent point Tm. Accordingly, the flow of the unvulcanized rubber on the first projection 74$f$ side and the flow of the unvulcanized rubber on the second projection 74$n$ side can be controlled in a well-balanced manner. Disturbance may be less likely to occur in the flow of the unvulcanized rubber, and thus, with the mold 56, the curved land surface 46B in which the shape of the curved land surface-forming portion 76B is reflected can be formed. With the mold 56 and the production method for the tire 2 using the mold 56, the ground-contact surface shape and the ground-contact pressure distribution of the tire 2 can be made appropriate, so that improvement of the steering stability and the wear resistance of the tire 2 can be achieved. In the case where the cross-sectional area of the first projection 74$f$ and the cross-sectional area of the second projection 74$n$ are equal to each other, the contour of the curved land surface-forming portion 76B may be represented by one circular arc.

[Case where Projection 74 Located Adjacent to Curved Land Surface-Forming Portion 76B is Shoulder Projection 74$s$]

The case where the projection 74 located adjacent to the curved land surface-forming portion 76B is the shoulder projection 74$s$ will be described with the case where the second projection 74$n$ is the projection 74 located on the outermost side in the axial direction, as an example. In the case where the second projection 74*n* is the projection 74 located on the outermost side in the axial direction, the shoulder land surface 46*s* of the tire 2 can be formed by the second land surface-forming portion 76*n* in FIG. 4. The following will describe the contour of the second land surface-forming portion 76*n* for forming the shoulder land surface 46*s*, that is, the shoulder land surface-forming portion 76*s*, with reference to FIG. 4.

In the mold 56, the second projection 74*n* can be located between the shoulder land surface-forming portion 76*s* and the curved land surface-forming portion 76B. In the second projection 74*n*, the side surface 80 on the curved land surface-forming portion 76B side may be the reference side surface 80*a*, and the side surface 80 on the shoulder land surface-forming portion 76*s* side may be the back side surface 80*b*.

In FIG. 4, reference character Tsm can represent the tangent point between the shoulder land surface-forming portion 76*s* and the reference forming surface FBL. The tangent point Tsm can be a shoulder reference tangent point. In the case where the shoulder land surface-forming portion 76*s* and the reference forming surface FBL are tangent to each other along a line and not at a point, the shoulder reference tangent point Tsm can be specified by the inner end of the tangent line between the shoulder land surface-forming portion 76*s* and the reference forming surface FBL.

In FIG. 4, reference character BBsm can represent the boundary between the back side surface 80*b* of the second projection 74*n* and the shoulder land surface-forming portion 76*s*. The boundary BBsm can be a shoulder reference boundary point. An alternate long and two short dashes line BLsm can be a virtual line of the back side surface 80*b*. Reference character BVsm can represent a virtual point of intersection represented as the point of intersection of the virtual line BLsm of the back side surface 80*b* and the reference forming surface FBL. The virtual point of intersection BVsm can be a shoulder reference virtual point of intersection. A double-headed arrow Xdsm can represent the distance from the shoulder reference virtual point of intersection BVsm to the shoulder reference boundary point BBsm. The distance Xdsm can be measured along the virtual line BLsm of the back side surface 80*b*. A double-headed arrow Xwsm can represent the distance from the shoulder reference virtual point of intersection BVsm to the shoulder reference tangent point Tsm. The distance Xwsm may be represented as the length of a line segment connecting the shoulder reference virtual point of intersection BVsm and the shoulder reference tangent point Tsm.

In the mold 56, of the contour of the shoulder land surface-forming portion 76*s*, the contour from the shoulder reference boundary point BBsm to the shoulder reference tangent point Tsm can be formed similar to the contour, of the curved land surface-forming portion 76B, from the second reference boundary point BB2*m* to the reference tangent point Tm. Specifically, the distance Xdsm from the shoulder reference virtual point of intersection BVsm to the shoulder reference boundary point BBsm can be equal to the distance Xd2*m* from the second reference virtual point of intersection BV2*m* to the second reference boundary point BB2*m*. The distance Xwsm from the shoulder reference virtual point of intersection BVsm to the shoulder reference tangent point Tsm can be equal to the distance Xw2*m* from the second reference virtual point of intersection BV2*m* to the reference tangent point Tm. Similar to the contour, of the curved land surface-forming portion 76B, from the second reference boundary point BB2*m* to the reference tangent point Tm, the contour, of the shoulder land surface-forming portion 76*s*, from the shoulder reference boundary point BBsm to the shoulder reference tangent point Tsm can be represented by a circular arc that passes through the shoulder reference boundary point BBsm and that is tangent to the reference forming surface FBL at the shoulder reference tangent point Tsm.

In the mold 56, the shoulder reference boundary point BBsm also may be the end on the second projection 74*n* side of the shoulder land surface-forming portion 76*s*. As shown in FIG. 4, the end BBsm on the second projection 74*n* side of the shoulder land surface-forming portion 76*s* can be located inward of the reference forming surface FBL of the tread-forming surface 64 in the radial direction.

In the production of the tire 2, by the cap portion 26 being pressed by the projections 74, the unvulcanized rubber for the cap portion 26 can flow toward the portion that is axially outward of the second projection 74*n*, that is, the portion where the shoulder land portion 44*s* is to be formed. In the mold 56, the contour of the shoulder land surface-forming portion 76*s* can be formed such that the end BBsm of the shoulder land surface-forming portion 76*s* is located inward of the reference forming surface FBL of the tread-forming surface 64. The volume of the unvulcanized rubber that flows to the portion where the shoulder land portion 44*s* is to be formed can be limited, and thus disturbance may be less likely to occur in the flow of the unvulcanized rubber pressed by the second projection 74*n*. With the mold 56, the shoulder land surface 46*s* in which the shape of the shoulder land surface-forming portion 76*s* is reflected can be formed. Since disturbance of the inner surface shape of the tread 4 may also be inhibited, the inner surface of the tread 4 can be formed in an appropriate shape.

As shown in FIG. 5, in the ground-contact surface shape of the tire 2 produced by the mold 56, the outer edge in the circumferential direction of each shoulder land portion 44*s* may not have a shape that is convex inward as in the outer edge in the circumferential direction of each shoulder land portion confirmed for the tire produced by the conventional mold and shown in FIG. 9, but can have a shape that bulges outward. The area of the ground-contact surface can be clearly increased, so that the tire 2 can more sufficiently come into contact with a road surface than the tire produced by the conventional mold. With the mold 56, the steering stability of the tire 2 can be further improved.

As shown in FIG. 6, in the ground-contact pressure distribution of the tire 2 produced by the mold 56, the increase in ground-contact pressure at each edge of the shoulder land portion 44*s* may be suppressed as compared to the increase in ground-contact pressure at each edge of the shoulder land portion confirmed for the tire produced by the conventional mold and shown in FIG. 10. In the example shown in FIG. 6, the ground-contact pressure difference in the shoulder land portion 44*s* can be reduced to about 70 kPa, for instance. The local increase in ground-contact pressure may be clearly suppressed, so that the wear resistance of the tire 2 can be further improved with the mold 56.

The tire 2 shown in FIG. 1 can be produced using the above-described mold 56 having the tread-forming surface 64. Next, the contour of the tread surface 22 shaped by the tread-forming surface 64 will be described.

[Contour of Curved Land Surface 46B]

The contour of the curved land surface 46B located between the two circumferential grooves 42 will be described based on the contour of the middle land surface 46*m* shown in FIG. 2. As described above, the middle land surface 46*m* can be the curved land surface 46B located between the first circumferential groove 42f as the middle circumferential groove 42m and the second circumferential groove 42n as the shoulder circumferential groove 42s.

As described above, in the tire 2, the reference surface TBL of the tread surface 22 can have a contour represented by at least one circular arc and can be tangent to the curved land surface 46B, the first land surface 46f, and the second land surface 46n. In FIG. 2, reference character Tt can represent the tangent point between the curved land surface 46B and the reference surface TBL. In the tire 2, the tangent point Tt may be a reference tangent point.

In the tire 2, the contour of the curved land surface 46B may be represented by one or more circular arcs. The above-described first reference boundary point BB1t may also be the end on the first circumferential groove 42f side of the curved land surface 46B. The above-described second reference boundary point BB2t may also be the end on the second circumferential groove 42n side of the curved land surface 46B. As shown in FIG. 2, the end BB1t on the first circumferential groove 42f of the curved land surface 46B can be located inward of the reference surface TBL of the tread surface 22 in the radial direction. The end BB2t on the second circumferential groove 42n side of the curved land surface 46B can also be located inward of the reference surface TBL of the tread surface 22 in the radial direction.

In the production of the tire 2, by the cap portion 26 being pressed by the first projection 74f and the second projection 74n, the unvulcanized rubber for the cap portion 26 can flow toward the portion between the first projection 74f and the second projection 74n, that is, the curved land surface-forming portion 76B. In the tire 2, the contour of the curved land surface 46B can be formed such that the ends BB1t and BB2t of the curved land surface 46B are located inward of the reference surface TBL. The volume of the unvulcanized rubber that flows to the curved land surface-forming portion 76B can be limited, and thus disturbance may be inhibited from occurring in the flow of the unvulcanized rubber pressed by the first projection 74f and the second projection 74n.

As described above, in the mold 56 for the tire 2, the volume of the unvulcanized rubber pressed by the second projection 74n can be larger than the volume of the unvulcanized rubber pressed by the first projection 74f. There may be a concern that a difference may occur between the flow of the unvulcanized rubber on the first projection 74f side and the flow of the unvulcanized rubber on the second projection 74n side.

However, in the tire 2, the distance Xd2t from the second reference virtual point of intersection BV2t to the second reference boundary point BB2t on the second circumferential groove 42n side can be longer than the distance Xd1t from the first reference virtual point of intersection BV1t to the first reference boundary point BB1t on the first circumferential groove 42f side. In other words, the distance Xd1t from the first reference virtual point of intersection BV1t to the first reference boundary point BB1t on the first circumferential groove 42f side can be shorter, and the distance Xd2t from the second reference virtual point of intersection BV2t to the second reference boundary point BB2t on the second circumferential groove 42n side can be longer. In the production of the tire 2, the volume of the unvulcanized rubber that flows to the curved land surface-forming portion 76B can be effectively limited on the second projection 74n side. The flow of the unvulcanized rubber on the first projection 74f side and the flow of the unvulcanized rubber on the second projection 74n side can be controlled in a well-balanced manner, and thus the curved land surface 46B in which the shape of the curved land surface-forming portion 76B is reflected can be formed. Since disturbance of the inner surface shape of the tread 4 may also be inhibited, the inner surface of the tread 4 can be formed in an appropriate shape.

As described above, in the ground-contact surface shape of the tire 2 shown in FIG. 5, the outer edge in the circumferential direction of the middle land portion 44m located between each shoulder circumferential groove 42s and the middle circumferential groove 42m may not have a shape that is convex inward as in the outer edge in the circumferential direction of each middle land portion confirmed for the tire produced by the conventional mold and shown in FIG. 9, but can have a shape that bulges outward. The area of the ground-contact surface can be clearly increased, so that the tire 2 can more sufficiently come into contact with a road surface than the tire produced by the conventional mold. The steering stability of the tire 2 can be further improved.

As described above, in the ground-contact pressure distribution of the tire 2 shown in FIG. 6, the increase in ground-contact pressure at each edge of the middle land portion 44m can be suppressed as compared to the increase in ground-contact pressure at each edge of the middle land portion confirmed for the tire produced by the conventional mold and shown in FIG. 10. The local increase in ground-contact pressure can be clearly suppressed, so that the wear resistance of the tire 2 can be further improved.

In the tire 2, an appropriate ground-contact surface shape and an appropriate ground-contact pressure distribution can be obtained. The steering stability and the wear resistance of the tire 2 can be improved.

In FIG. 2, a double-headed arrow Wct can represent the distance from the first reference virtual point of intersection BV1t to the second reference virtual point of intersection BV2t. A double-headed arrow Xw1t can represent the distance from the first reference virtual point of intersection BV1t to the reference tangent point Tt. A double-headed arrow Xw2t can represent the distance from the second reference virtual point of intersection BV2t to the reference tangent point Tt.

In the tire 2, the position of the reference tangent point Tt, which can be the tangent point between the curved land surface 46B and the reference surface TBL, can be determined based on the cross-sectional areas of the circumferential grooves 42 located on both sides of the curved land surface 46B. Specifically, when the groove cross-sectional area of the first circumferential groove 42f is denoted by Sat, and the groove cross-sectional area of the second circumferential groove 42n is denoted by Sbt, the distance Xw1t can be set such that the following formula (2) represented by using the distance Xw1t, the distance Wct, the groove cross-sectional area Sat, and the groove cross-sectional area Sbt can be satisfied.

$$Sat/(Sat+Sbt) \times 100-10 \leq Xw1t/Wct \times 100 \leq Sat/(Sat+Sbt) \times 100+10 \quad (2)$$

In the tire mold 56, since the groove cross-sectional area Sat of the first circumferential groove 42f can be smaller than the groove cross-sectional area Sbt of the second circumferential groove 42n, the reference tangent point Tt can be set on the first reference boundary point BB1t side. In the production of the tire 2, the flow of the unvulcanized rubber to the first projection 74f side having a smaller cross-sectional area can be promoted. In the tire 2, in the case where the groove cross-sectional area Sat of the first circumferential groove 42f is larger than the groove cross-sectional area Sbt of the second circumferential groove 42n, the reference tangent point Tm can be set on the second reference boundary point BB2t side. In this case, the flow of the unvulcanized rubber to the second projection 74n side can be promoted.

In the production of the tire 2, the flow of the unvulcanized rubber on the first projection 74f side and the flow of the unvulcanized rubber on the second projection 74n side can be controlled in a well-balanced manner, and thus the curved land surface 46B in which the shape of the curved land surface-forming portion 76B is reflected can be formed. In the tire 2, an appropriate ground-contact surface shape and an appropriate ground-contact pressure distribution can be obtained. The tire 2 can achieve improvement of steering stability and wear resistance.

In the tire 2, from the viewpoint of making the ground-contact surface shape and the ground-contact pressure distribution appropriate, the ratio (Xdt/St) of a distance Xdt from a reference virtual point of intersection BVt to a reference boundary point BBt to a groove cross-sectional area St of the circumferential groove 42 can be not less than 0.0008, for instance, not less than 0.0014, such as not less than 0.0020. The ratio (Xdt/St) can be not greater than 0.0040, for instance, not greater than 0.0034, such as not greater than 0.0028.

As described above, in the tire 2, the groove cross-sectional area Sat of the first circumferential groove 42f can be smaller than the groove cross-sectional area Sbt of the second circumferential groove 42n. In the case where the groove cross-sectional area Sat of the first circumferential groove 42f and the groove cross-sectional area Sbt of the second circumferential groove 42n are different from each other, from the viewpoint that the flow of the unvulcanized rubber on the first projection 74f side and the flow of the unvulcanized rubber on the second projection 74n side can be controlled in a well-balanced manner and disturbance may be effectively inhibited from occurring in the flow of the unvulcanized rubber, the ratio (Xd1t/Sat) of the distance Xd1t from the first reference virtual point of intersection BV1t to the first reference boundary point BB1t to the cross-sectional area Sat of the first circumferential groove 42f on the first circumferential groove 42f side can be not less than 0.0008 and not greater than 0.0040, and the ratio (Xd2t/Sbt) of the distance Xd2t from the second reference virtual point of intersection BV2t to the second reference boundary point BB2t to the groove cross-sectional area Sbt of the second circumferential groove 42n on the second circumferential groove 42n side can be not less than 0.0008, for instance, not greater than 0.0040. In this case, the ratio (Xd1t/Sat) and the ratio (Xd2t/Sbt) can be set to the same value.

As described above, the contour of the curved land surface 46B may be represented by one or more circular arcs. In the tire 2, from the viewpoint of making the ground-contact surface shape and the ground-contact pressure distribution appropriate, the contour of the curved land surface 46B may be represented by a circular arc that passes through the first reference boundary point BB1t and that is tangent to the reference surface TBL at the reference tangent point Tt, and a circular arc that passes through the second reference boundary point BB2t and that is tangent to the reference surface TBL at the reference tangent point Tt.

[Case Where Circumferential Groove 42 Located Adjacent to Curved Land Surface 46B is Shoulder Circumferential Groove 42s]

In the case where the second circumferential groove 42n is the shoulder circumferential groove 42s located on the outermost side in the axial direction, the second land surface 46n in FIG. 2 can form the shoulder land surface 46s of the tire 2. The following will describe the contour of the shoulder land surface 46s with reference to FIG. 2.

In the tire 2, the second circumferential groove 42n can be located between the shoulder land surface 46s and the curved land surface 46B. In the second circumferential groove 42n, the wall 50 on the curved land surface 46B side can be the reference wall 50a, and the wall 50 on the shoulder land surface 46s side can be the facing wall 50b.

In FIG. 2, reference character Tst can represent the tangent point between the shoulder land surface 46s and the reference surface TBL. The tangent point Tst can be a shoulder reference tangent point.

In FIG. 2, reference character BBst can represent the boundary between the facing wall 50b of the second circumferential groove 42n and the shoulder land surface 46s. The boundary BBst can be a shoulder reference boundary point. An alternate long and two short dashes line BLst may be a virtual line of the facing wall 50b. Reference character BVst can represent a virtual point of intersection represented as the point of intersection of the virtual line BLst of the facing wall 50b and the reference surface TBL. The virtual point of intersection BVst can be a shoulder reference virtual point of intersection. A double-headed arrow Xdst can represent the distance from the shoulder reference virtual point of intersection BVst to the shoulder reference boundary point BBst. The distance Xdst can be measured along the virtual line BLst of the facing wall 50b. A double-headed arrow Xwst can represent the distance from the shoulder reference virtual point of intersection BVst to the shoulder reference tangent point Tst. The distance Xwst can be represented as the length of a line segment connecting the shoulder reference virtual point of intersection BVst and the shoulder reference tangent point Tst.

In the tire 2, of the contour of the shoulder land surface 46s, the contour from the shoulder reference boundary point BBst to the shoulder reference tangent point Tst can be formed similar to the contour, of the curved land surface 46B, from the second reference boundary point BB2t to the reference tangent point Tt. Specifically, the distance Xdst from the shoulder reference virtual point of intersection BVst to the shoulder reference boundary point BBst can be equal to the distance Xd2t from the second reference virtual point of intersection BV2t to the second reference boundary point BB2t. The distance Xwst from the shoulder reference virtual point of intersection BVst to the shoulder reference tangent point Tst can be equal to the distance Xw2t from the second reference virtual point of intersection BV2t to the reference tangent point Tt. Similar to the contour, of the curved land surface 46B, from the second reference boundary point BB2t to the reference tangent point Tt, the contour, of the shoulder land surface 46s, from the shoulder reference boundary point BBst to the shoulder reference tangent point Tst can be represented by a circular arc that passes through the shoulder reference boundary point BBst and that is tangent to the reference surface TBL at the shoulder reference tangent point Tst.

In the tire 2, the shoulder reference boundary point BBst may also be the end on the second circumferential groove 42n side of the shoulder land surface 46s. As shown in FIG. 2, the end BBst on the second circumferential groove 42n side of the shoulder land surface 46s can be located inward of the reference surface TBL of the tread surface 22 in the radial direction.

In the production of the tire 2, by the cap portion 26 being pressed by the projection 74, the unvulcanized rubber for the cap portion 26 can flow toward the portion that is axially outward of the second projection 74n, that is, the portion where the shoulder land portion 44s is to be formed. In the tire 2, the contour of the shoulder land surface 46s can be formed such that the end BBst of the shoulder land surface 46s can be located inward of the reference surface TBL of the tread surface 22. The volume of the unvulcanized rubber that flows to the portion where the shoulder land portion 44s is to be formed can be limited, and thus disturbance may be less likely to occur in the flow of the unvulcanized rubber pressed by the second projection 74n. In the tire 2, the shoulder land surface 46s in which the shape of the shoulder land surface-forming portion 76s is reflected can be formed. Since disturbance of the inner surface shape of the tread 4 may also be inhibited, the inner surface of the tread 4 can be formed in an appropriate shape.

As described above, in the ground-contact surface shape of the tire 2 shown in FIG. 5, the outer edge in the circumferential direction of each shoulder land portion 44s may not have a shape that is convex inward as in the outer edge in the circumferential direction of each shoulder land portion confirmed for the tire produced by the conventional mold and shown in FIG. 9, but can have a shape that bulges outward. The area of the ground-contact surface can be clearly increased, so that the tire 2 can more sufficiently come into contact with a road surface than the tire produced by the conventional mold. The steering stability of the tire 2 can be further improved.

As described above, in the ground-contact pressure distribution of the tire 2 shown in FIG. 6, the increase in ground-contact pressure at each edge of the middle land portion 44m can be suppressed as compared to the increase in ground-contact pressure at each edge of the middle land portion confirmed for the tire produced by the conventional mold, for instance, shown in FIG. 10. The local increase in ground-contact pressure can be clearly suppressed, so that the wear resistance of the tire 2 can be further improved.

Second Embodiment

Figure 7:
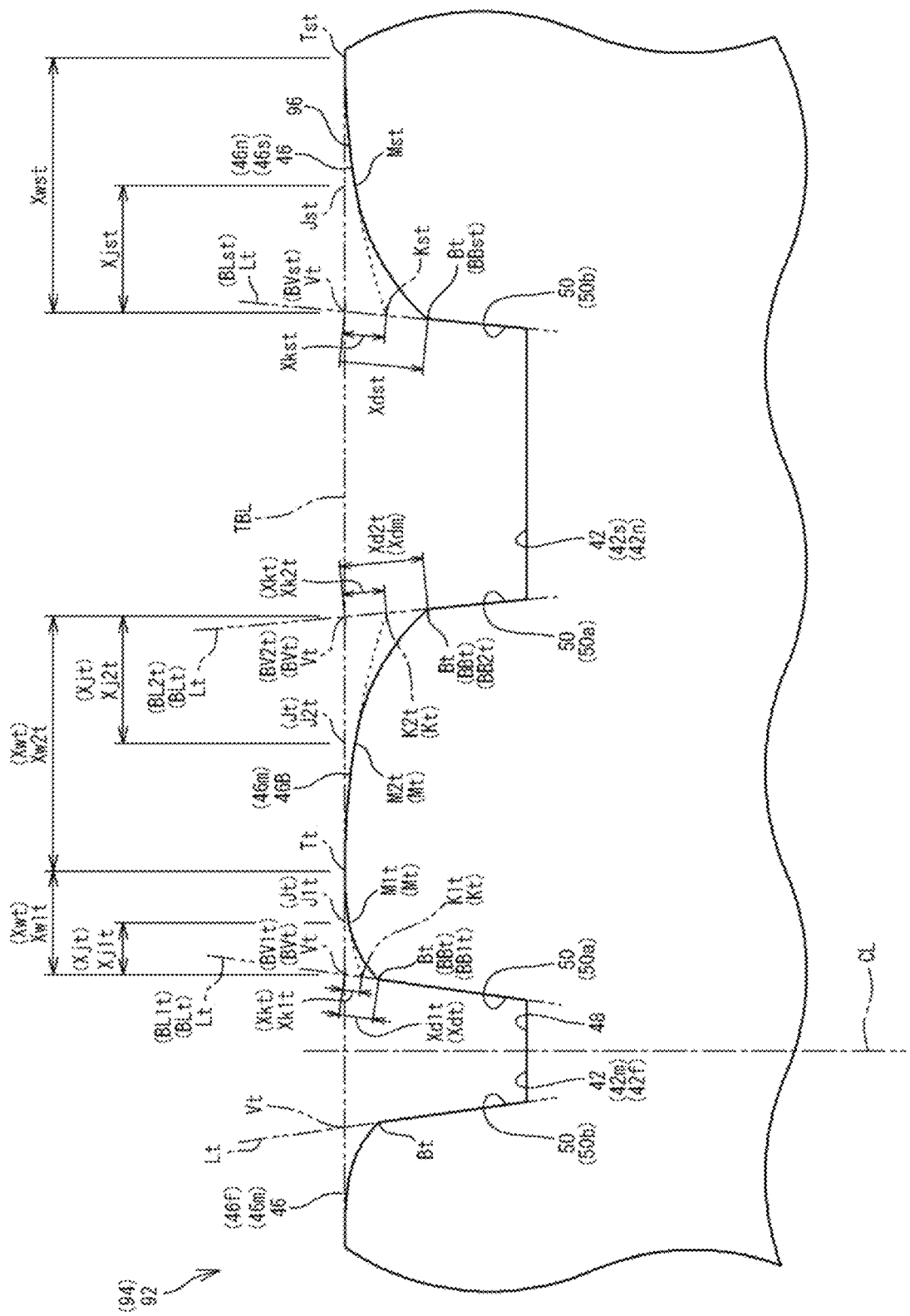
FIG. 7 is an enlarged cross-sectional view showing a modification of a tread surface shown in FIG. 2.

FIG. 7 shows a cross-section of a tread 94 of a tire 92 according to another embodiment of the present disclosure. In FIG. 7, the contour of a tread surface 96 is schematically represented. In FIG. 7, the right-left direction is the axial direction of the tire 92, and the up-down direction is the radial direction of the tire 92. The direction perpendicular to the surface of the sheet of FIG. 7 is the circumferential direction of the tire 92.

The contour of the tread surface 96 shown in FIG. 7 is a modification of the contour of the tread surface 22 shown in FIG. 2. Of the contour of the tread surface 96 shown in FIG. 7, portions having the same details as the contour of the tread surface 22 shown in FIG. 2 are designated by the same reference characters, and the description thereof is omitted.

Figure 8:
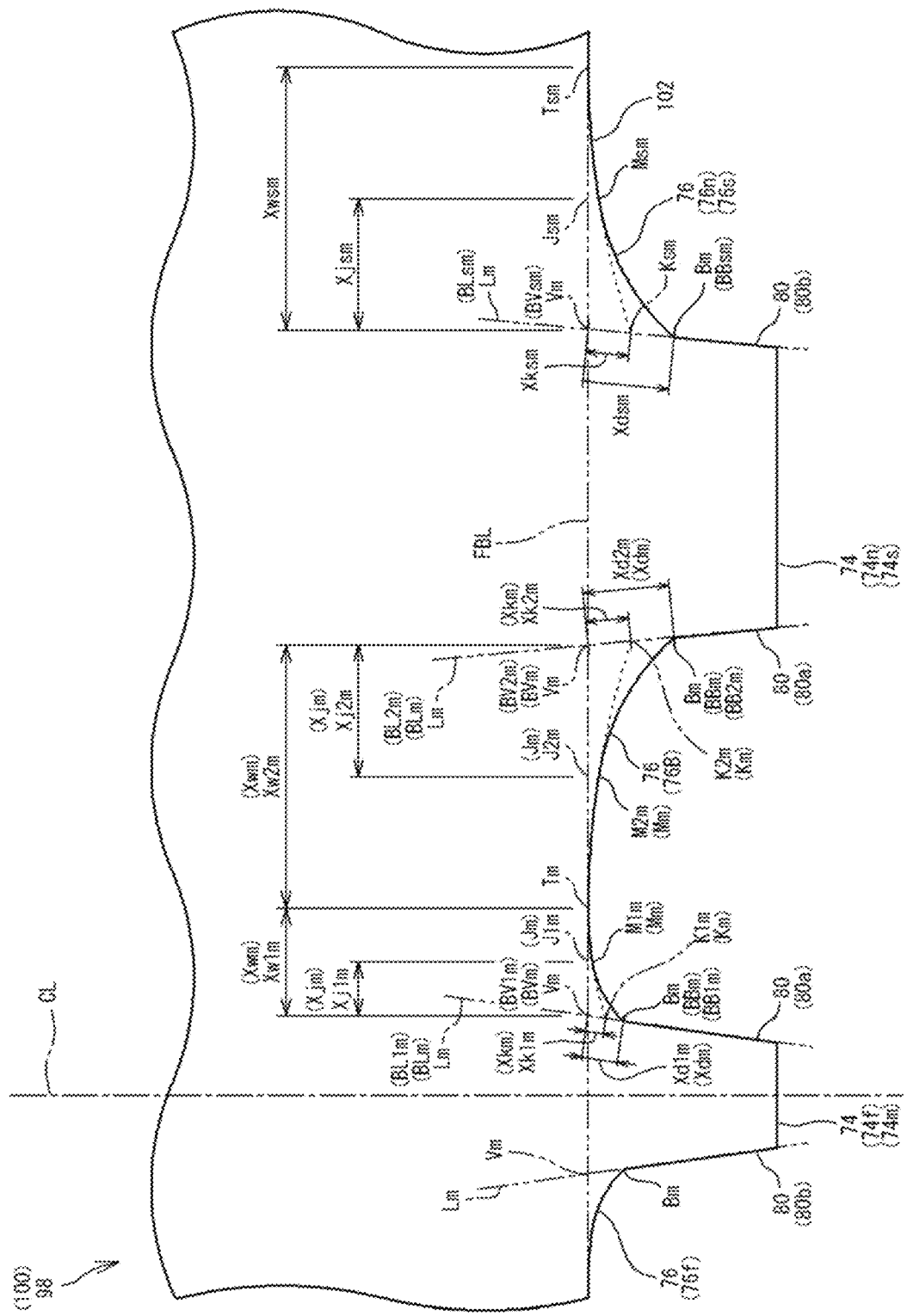
FIG. 8 is an enlarged cross-sectional view showing a modification of a tread-forming surface shown in FIG. 4.

FIG. 8 shows a cross-section of a tread ring 100 which can form a part of a mold 98 used for producing the tire 92 shown in FIG. 7, for instance. In FIG. 8, the contour of a tread-forming surface 102 for shaping the tread surface 96 is schematically represented. In FIG. 8, the right-left direction is the axial direction of the tire 92, and the up-down direction is the radial direction of the tire 92. The direction perpendicular to the surface of the sheet of FIG. 8 is the circumferential direction of the tire 92.

The contour of the tread-forming surface 102 shown in FIG. 8 is a modification of the contour of the tread-forming surface 64 shown in FIG. 4. Of the contour of the tread-forming surface 102 shown in FIG. 8, portions having the same details as the contour of the tread-forming surface 64 shown in FIG. 4 are designated by the same reference characters, and the description thereof is omitted.

[Contour of Curved Land Surface-Forming Portion 76B]

First, the contour of the curved land surface-forming portion 76B included in the tread-forming surface 102 shown in FIG. 8 will be described. In the tread-forming surface 102 as well, the contour of the curved land surface-forming portion 76B may be represented by one or more circular arcs. From the viewpoint of obtaining a more appropriate ground-contact surface shape and a more appropriate ground-contact pressure distribution, the contour of the curved land surface-forming portion 76B in the tread-forming surface 102 can be represented by the following four circular arcs.

In FIG. 8, reference character K1m can represent any position that is on the virtual line BL1m of the first reference side surface 80a of the first projection 74f and that is between the first reference boundary point BB1m and the first reference virtual point of intersection BV1m. The position K1m can be a vertical point (hereinafter, first vertical point). A double-headed arrow Xk1m can represent the distance from the first reference virtual point of intersection BV1m to the first vertical point K1m. The distance Xk1m can be measured along the virtual line BL1m of the first reference side surface 80a. In the tread-forming surface 102, a circular arc that passes through the first vertical point K1m and that is tangent to the reference forming surface FBL at the reference tangent point Tm can be a tangent point-side circular arc (hereinafter, first tangent point-side circular arc).

In FIG. 8, reference character J1m can represent any position that is on the reference forming surface FBL and that is between the reference tangent point Tm and the first reference virtual point of intersection BV1m. The position J1m can be a horizontal point (hereinafter, first horizontal point). A double-headed arrow Xj1m can represent the distance from the first reference virtual point of intersection BV1m to the first horizontal point J1m. The distance Xj1m can be represented as the length of a line segment connecting the first reference virtual point of intersection BV1m and the first horizontal point J1m. Reference character M1m can represent the point of intersection of the first tangent point-side circular arc and a normal line that passes through the first horizontal point J1m and that is normal to the reference forming surface FBL. The point of intersection M1m can be an intermediate boundary point (hereinafter, first intermediate boundary point). In the tread-forming surface 102, a circular arc that passes through the first reference boundary point BB1m and that is tangent to the first tangent point-side circular arc at the first intermediate boundary point M1m can be a boundary-side circular arc (hereinafter, first boundary-side circular arc).

In FIG. 8, reference character K2m can represent any position that is on the virtual line BL2m of the second reference side surface 80a of the second projection 74n and that is between the second reference boundary point BB2m and the second reference virtual point of intersection BV2m. The position K2m can be a vertical point (hereinafter, second vertical point). A double-headed arrow Xk2m can represent the distance from the second reference virtual point of intersection BV2m to the second vertical point K2m. The distance Xk2m can be measured along the virtual line BL2m of the second reference side surface 80a. In the tread-forming surface 102, a circular arc that passes through the second vertical point K2m and that is tangent to the reference forming surface FBL at the reference tangent point Tm can be in the form of a tangent point-side circular arc (hereinafter, second tangent point-side circular arc).

In FIG. 8, reference character J2m can represent any position that is on the reference forming surface FBL and that is between the reference tangent point Tm and the second reference virtual point of intersection BV2m. The position J2m can be a horizontal point (hereinafter, second horizontal point). A double-headed arrow Xj2m can represent the distance from the second reference virtual point of intersection BV2m to the second horizontal point J2m. The distance Xj2m can be represented as the length of a line segment connecting the second reference virtual point of intersection BV2m and the second horizontal point J2m. Reference character M2m can represent the point of intersection of the second tangent point-side circular arc and a normal line that passes through the second horizontal point J2m and that is normal to the reference forming surface FBL. The point of intersection M2m can be an intermediate boundary point (hereinafter, second intermediate boundary point). In the tread-forming surface 102, a circular arc that passes through the second reference boundary point BB2m and that is tangent to the second tangent point-side circular arc at the second intermediate boundary point M2m can be a boundary-side circular arc (hereinafter, second boundary-side circular arc).

In the mold 98, of the contour of the curved land surface-forming portion 76B, the contour from the reference tangent point Tm to the first intermediate boundary point M1m can be represented by the first tangent point-side circular arc. The contour from the first intermediate boundary point M1m to the first reference boundary point BB1m can be represented by the first boundary-side circular arc. The contour from the reference tangent point Tm to the second intermediate boundary point M2m can be represented by the second tangent point-side circular arc. The contour from the second intermediate boundary point M2m to the second reference boundary point BB2m can be represented by the second boundary-side circular arc.

In the mold 98 as well, the flow of the unvulcanized rubber on the first projection 74f side and the flow of the unvulcanized rubber on the second projection 74n side can be controlled in a well-balanced manner. Disturbance may be less likely to occur in the flow of the unvulcanized rubber, and thus, with the mold 98, the curved land surface 46B in which the shape of the curved land surface-forming portion 76B is reflected can be formed.

It can be confirmed that in the ground-contact surface shape of the tire 92 produced by the mold 98, the outer edge in the circumferential direction of the middle land portion 44m may not have a shape that is convex inward, but can have a shape that bulges outward, and it can be confirmed that in the ground-contact pressure distribution of the tire 92, the difference in contact pressure in the middle land portion 44m can be reduced to about 45 kPa, for instance. With the mold 98 and the production method for the tire 92 using the mold 98, the ground-contact surface shape and the ground-contact pressure distribution of the tire 92 can be made appropriate, so that improvement of the steering stability and the wear resistance of the tire 92 can be achieved.

In the mold 98, from the viewpoint of making the ground-contact surface shape and the ground-contact pressure distribution of the tire 92 appropriate, the ratio (Xkm/Xdm) of a distance Xkm from the reference virtual point of intersection BVm to a vertical point Km to the distance Xdm from the reference virtual point of intersection BVm to the reference boundary point BBm can be not less than 0.40, for instance, not less than 0.45. The ratio (Xkm/Xdm) can be not greater than 0.60, for instance, not greater than 0.55.

In the mold 98, from the viewpoint of making the ground-contact surface shape and the ground-contact pressure distribution of the tire 92 appropriate, the ratio (Xjm/Xwm) of a distance Xjm from the reference virtual point of intersection BVm to a horizontal point Jm to a distance Xwm from the reference virtual point of intersection BVm to the reference tangent point Tm can be not less than 0.40, for instance, not less than 0.45. The ratio (Xjm/Xwm) can be not greater than 0.60, for instance, not greater than 0.55.

In the mold 98, the ratio (Xkm/Xdm) of the distance Xkm from the reference virtual point of intersection BVm to the vertical point Km to the distance Xdm from the reference virtual point of intersection BVm to the reference boundary point BBm may not be less than 0.40 and/or may not be greater than 0.60, and the ratio (Xjm/Xwm) of the distance Xjm from the reference virtual point of intersection BVm to the horizontal point Jm to the distance Xwm from the reference virtual point of intersection BVm to the reference tangent point Tm may not be less than 0.40 and/or may not be greater than 0.60.

In the mold 98, the cross-sectional area Sam of the first projection 74f can be smaller than the cross-sectional area Sbm of the second projection 74n. In the case where the cross-sectional area Sam of the first projection 74f and the cross-sectional area Sbm of the second projection 74n are different from each other, from the viewpoint that the flow of the unvulcanized rubber on the first projection 74f side and the flow of the unvulcanized rubber on the second projection 74n side can be controlled in a well-balanced manner, disturbance can be effectively inhibited from occurring in the flow of the unvulcanized rubber, and the ground-contact surface shape and the ground-contact pressure distribution of the tire 92 can be made appropriate, the ratio (Xk1m/Xd1m) of the distance Xk1m from the first reference virtual point of intersection BV1m to the first vertical point K1m to the distance Xd1m from the first reference virtual point of intersection BV1m to the first reference boundary point BB1m can be not less than 0.40 and/or not greater than 0.60, and the ratio (Xk2m/Xd2m) of the distance Xk2m from the second reference virtual point of intersection BV2m to the second vertical point K2m to the distance Xd2m from the second reference virtual point of intersection BV2m to the second reference boundary point BB2m can be not less than 0.40 and/or not greater than 0.60. In this case, the ratio (Xk1m/Xd1m) and the ratio (Xk2m/Xd2m) can be set to the same value.

From the same viewpoint, the ratio (Xj1m/Xw1m) of the distance Xj1m from the first reference virtual point of intersection BV1m to the first horizontal point J1m to the distance Xw1m from the first reference virtual point of intersection BV1m to the reference tangent point Tm can be not less than 0.40 and/or not greater than 0.60, and the ratio (Xj2m/Xw2m) of the distance Xj2m from the second reference virtual point of intersection BV2m to the second horizontal point J2m to the distance Xw2m from the second reference virtual point of intersection BV2m to the reference tangent point Tm can be not less than 0.40 and/or not greater than 0.60. In this case, the ratio (Xj1m/Xw1m) and the ratio (Xj2m/Xw2m) can be set to the same value.

[Case Where Projection 74 Located Adjacent to Curved Land Surface-Forming Portion 76B is Shoulder Projection 74s]

In the case where the second projection 74n located adjacent to the curved land surface-forming portion 76B is the shoulder projection 74s, the second land surface-forming portion 76n in FIG. 8 can be the shoulder land surface-forming portion 76s for forming the shoulder land surface 46s of the tire 92. Of the contour of the shoulder land surface-forming portion 76s in the tread-forming surface 102, the contour from the shoulder reference boundary point BBsm to the shoulder reference tangent point Tsm can be represented by two circular arcs from the viewpoint of obtaining a more appropriate ground-contact surface shape and a more appropriate ground-contact pressure distribution. The following will describe the contour, of the shoulder land surface-forming portion 76s, from the shoulder reference boundary point BBsm to the shoulder reference tangent point Tsm with reference to FIG. 8.

In FIG. 8, reference character Ksm can represent any point that is on the virtual line BLsm of the back side surface 80b of the second projection 74n and that is between the shoulder reference boundary point BBsm and the shoulder reference virtual point of intersection BVsm. The position Ksm can be a shoulder vertical point. A double-headed arrow Xksm can represent the distance from the shoulder reference virtual point of intersection BVsm to the shoulder vertical point Ksm. The distance Xksm can be measured along the virtual line BLsm of the back side surface 80b. In the tread-forming surface 102, a circular arc that passes through the shoulder vertical point Ksm and that is tangent to the reference forming surface FBL at the shoulder reference tangent point Tsm can be a shoulder tangent point-side circular arc.

In FIG. 8, reference character Jsm can represent any position that is on the reference forming surface FBL and that is between the shoulder reference tangent point Tsm and the shoulder reference virtual point of intersection BVsm. The position Jsm can be a shoulder horizontal point. A double-headed arrow Xjsm can represent the distance from the shoulder reference virtual point of intersection BVsm to the shoulder horizontal point Jsm. The distance Xjsm can be represented as the length of a line segment connecting the shoulder reference virtual point of intersection BVsm and the shoulder horizontal point Jsm. Reference character Msm can represent the point of intersection of the shoulder tangent point-side circular arc and a normal line that passes through the shoulder horizontal point Jsm and that is normal to the reference forming surface FBL. The point of intersection Msm can be a shoulder intermediate boundary point. In the tread-forming surface 102, a circular arc that passes through the shoulder reference boundary point BBsm and that is tangent to the shoulder tangent point-side circular arc at the shoulder intermediate boundary point Msm can be a shoulder boundary-side circular arc.

In the mold 98, of the contour of the shoulder land surface-forming portion 76s, the contour from the shoulder reference tangent point Tsm to the shoulder intermediate boundary point Msm can be represented by the shoulder tangent point-side circular arc, and the contour from the shoulder intermediate boundary point Msm to the shoulder reference boundary point BBsm can be represented by the shoulder boundary-side circular arc. The distance Xdsm from the shoulder reference virtual point of intersection BVsm to the shoulder reference boundary point BBsm in the back side surface 80b of the second projection 74n can be equal to the distance Xd2m from the second reference virtual point of intersection BV2m to the second reference boundary point BB2m in the reference side surface 80a, that is, the second reference side surface 80a, and the distance Xwsm from the shoulder reference virtual point of intersection BVsm to the shoulder reference tangent point Tsm can be equal to the distance Xw2m from the second reference virtual point of intersection BV2m to the reference tangent point Tm. Furthermore, the distance Xksm from the shoulder reference virtual point of intersection BVsm to the shoulder vertical point Ksm can be equal to the distance Xk2m from the second reference virtual point of intersection BV2m to the second vertical point K2m, and the distance Xjsm from the shoulder reference virtual point of intersection BVsm to the shoulder horizontal point Jsm can be equal to the distance Xj2m from the second reference virtual point of intersection BV2m to the second horizontal point J2m.

In the mold 98 as well, disturbance may be less likely to occur in the flow of the unvulcanized rubber pressed by the second projection 74n, and thus the shoulder land surface 46s in which the shape of the shoulder land surface-forming portion 76s is reflected can be formed.

It can be confirmed that in the ground-contact surface shape of the tire 92 produced by the mold 98, the outer edge in the circumferential direction of the shoulder land portion 44s may not have a shape that is convex inward, but can have a shape that bulges outward, and it can be confirmed that in the ground-contact pressure distribution of the tire 92, the difference in contact pressure in the shoulder land portion 44s can be reduced to about 60 kPa. With the mold 98 and the production method for the tire 92 using the mold 98, the ground-contact surface shape and the ground-contact pressure distribution of the tire 92 can be made appropriate, so that improvement of the steering stability and the wear resistance of the tire 92 can be achieved.

The tire 92 shown in FIG. 7 can be produced using the above-described mold 98 having the tread-forming surface 102. Next, the contour of the tread surface 96 shaped by the tread-forming surface 102 will be described.

[Contour of Curved Land Surface 46B]

First, the contour of the curved land surface 46B included in the tread surface 96 shown in FIG. 7 will be described. In the tread surface 96 as well, the contour of the curved land surface 46B can be represented by a plurality of circular arcs. From the view point of obtaining a more appropriate ground-contact surface shape and a more appropriate ground-contact pressure distribution, the contour of the curved land surface 46B in the tread surface 96 can be represented by the following four circular arcs.

In FIG. 7, reference character K1t can represent any position that is on the virtual line BL1t of the first reference wall 50a of the first circumferential groove 42f and that is between the first reference boundary point BB1t and the first reference virtual point of intersection BV1t. The position K1t can be a vertical point (hereinafter, first vertical point). A double-headed arrow Xk1t can represent the distance from the first reference virtual point of intersection BV1t to the first vertical point K1t. The distance Xk1t can be represented as the length of a line segment connecting the first reference virtual point of intersection BV1t and the first vertical point K1t. In the tread surface 96, a circular arc that passes through the first vertical point K1t and that is tangent to the reference surface TBL at the reference tangent point Tt may be a tangent point-side circular arc (hereinafter, first tangent point-side circular arc).

In FIG. 7, reference character J1t can represent any position that is on the reference surface TBL and that is between the reference tangent point Tt and the first reference virtual point of intersection BV1t. The position J1t can be a horizontal point (hereinafter, first horizontal point). A double-headed arrow Xj1t can represent the distance from the first reference virtual point of intersection BV1t to the first horizontal point J1t. The distance Xj1t can be represented as the length of a line segment connecting the first reference virtual point of intersection BV1*t* and the first horizontal point J1*t*. Reference character M1*t* can represent the point of intersection of the first tangent point-side circular arc and a normal line that passes through the first horizontal point J1*t* and that is normal to the reference surface TBL. The point of intersection M1*t* can be an intermediate boundary point (hereinafter, first intermediate boundary point). In the tread surface 96, a circular arc that passes through the first reference boundary point BB1*t* and that is tangent to the first tangent point-side circular arc at the first intermediate boundary point M1*t* can be a boundary-side circular arc (hereinafter, first boundary-side circular arc).

In FIG. 7, reference character K2*t* can represent any position that is on the virtual line BL2*t* of the second reference wall 50*a* of the second circumferential groove 42*n* and that is between the second reference boundary point BB2*t* and the second reference virtual point of intersection BV2*t*. The position K2*t* can be a vertical point (hereinafter, second vertical point). A double-headed arrow Xk2*t* can represent the distance from the second reference virtual point of intersection BV2*t* to the second vertical point K2*t*. The distance Xk2*t* can be represented as the length of a line segment connecting the second reference virtual point of intersection BV2*t* and the second vertical point K2*t*. In the tread surface 96, a circular arc that passes through the second vertical point K2*t* and that is tangent to the reference surface TBL at the reference tangent point Tt can be a tangent point-side circular arc (hereinafter, second tangent point-side circular arc).

In FIG. 7, reference character J2*t* can represent any position that is on the reference surface TBL and that is between the reference tangent point Tt and the second reference virtual point of intersection BV2*t*. The position J2*t* can be a horizontal point (hereinafter, second horizontal point). A double-headed arrow Xj2*t* can represent the distance from the second reference virtual point of intersection BV2*t* to the second horizontal point J2*t*. The distance Xj2*t* can be represented as the length of a line segment connecting the second reference virtual point of intersection BV2*t* and the second horizontal point J2*t*. Reference character M2*t* can represent the point of intersection of the second tangent point-side circular arc and a normal line that passes through the second horizontal point J2*t* and that is normal to the reference surface TBL. The point of intersection M2*t* can be an intermediate boundary point (hereinafter, second intermediate boundary point). In the tread surface 96, a circular arc that passes through the second reference boundary point BB2*t* and that is tangent to the second tangent point-side circular arc at the second intermediate boundary point M2*m* can be in the form of a boundary-side circular arc (hereinafter, second boundary-side circular arc).

In the tire 92, of the contour of the curved land surface 46B, the contour from the reference tangent point Tt to the first intermediate boundary point M1*m* can be represented by the first tangent point-side circular arc. The contour from the first intermediate boundary point M1*m* to the first reference boundary point BB1*t* can be represented by the first boundary-side circular arc. The contour from the reference tangent point Tt to the second intermediate boundary point M2*m* can be represented by the second tangent point-side circular arc. The contour from the second intermediate boundary point M2*m* to the second reference boundary point BB2*t* can be represented by the second boundary-side circular arc.

In the production of the tire 92, the flow of the unvulcanized rubber on the first projection 74*f* side and the flow of the unvulcanized rubber on the second projection 74*n* side can be controlled in a well-balanced manner, and thus the curved land surface 46B in which the shape of the curved land surface-forming portion 76B is reflected can be formed. In the tire 92, an appropriate ground-contact surface shape and an appropriate ground-contact pressure distribution can be obtained. The tire 92 can achieve improvement of steering stability and wear resistance.

In the tire 92, from the viewpoint of being able to make the ground-contact surface shape and the ground-contact pressure distribution appropriate, the ratio (Xkt/Xdt) of a distance Xkt from the reference virtual point of intersection BVt to a vertical point Kt to the distance Xdt from the reference virtual point of intersection BVt to the reference boundary point BBt can be not less than 0.40, for instance, not less than 0.45. The ratio (Xkt/Xdt) can be not greater than 0.60, for instance, not greater than 0.55.

In the tire 92, from the viewpoint of being able to make the ground-contact surface shape and the ground-contact pressure distribution appropriate, the ratio (Xjt/Xwt) of a distance Xjt from the reference virtual point of intersection BVt to a horizontal point Jt to a distance Xwt from the reference virtual point of intersection BVt to the reference tangent point Tt can be not less than 0.40, for instance, not less than 0.45. The ratio (Xjt/Xwt) can be not greater than 0.60, for instance, not greater than 0.55.

In the tire 92, the ratio (Xkt/Xdt) of the distance Xkt from the reference virtual point of intersection BVt to the vertical point Kt to the distance Xdt from the reference virtual point of intersection BVt to the reference boundary point BBt can be not less than 0.40, for instance, not greater than 0.60, and the ratio (Xjt/Xwt) of the distance Xjt from the reference virtual point of intersection BVt to the horizontal point Jt to the distance Xwt from the reference virtual point of intersection BVt to the reference tangent point Tt can be not less than 0.40, for instance, not greater than 0.60.

In the tire 92, the groove cross-sectional area Sat of the first circumferential groove 42*f* can be smaller than the groove cross-sectional area Sbt of the second circumferential groove 42*n*. In the case where the groove cross-sectional area Sat of the first circumferential groove 42*f* and the groove cross-sectional area Sbt of the second circumferential groove 42*n* are different from each other, from the viewpoint that the flow of the unvulcanized rubber on the first projection 74*f* side and the flow of the unvulcanized rubber on the second projection 74*n* side can be controlled in a well-balanced manner, disturbance can be effectively inhibited from occurring in the flow of the unvulcanized rubber, and the ground-contact surface shape and the ground-contact pressure distribution of the tire 92 can be made appropriate, the ratio (Xk1*t*/Xd1*t*) of the distance Xk1*t* from the first reference virtual point of intersection BV1*t* to the first vertical point K1*t* to the distance Xd1*t* from the first reference virtual point of intersection BV1*t* to the first reference boundary point BB1*t* can be not less than 0.40 and/or not greater than 0.60, and the ratio (Xk2*t*/Xd2*t*) of the distance Xk2*t* from the second reference virtual point of intersection BV2*t* to the second vertical point K2*t* to the distance Xd2*t* from the second reference virtual point of intersection BV2*t* to the second reference boundary point BB2*t* can be not less than 0.40 and/or not greater than 0.60. In this case, the ratio (Xk1*t*/Xd1*t*) and the ratio (Xk2*t*/Xd2*t*) can be set to the same value.

From the same viewpoint, the ratio (Xj1*t*/Xw1*t*) of the distance Xj1*t* from the first reference virtual point of intersection BV1*t* to the first horizontal point J1*t* to the distance Xw1*t* from the first reference virtual point of intersection BV1t to the reference tangent point Tt can be not less than 0.40 and/or not greater than 0.60, and the ratio (Xj2t/Xw2t) of the distance Xj2t from the second reference virtual point of intersection BV2t to the second horizontal point J2t to the distance Xw2t from the second reference virtual point of intersection BV2t to the reference tangent point Tt can be not less than 0.40 and/or not greater than 0.60. In this case, the ratio (Xj1t/Xw1t) and the ratio (Xj2t/Xw2t) can be set to the same value.

[Case where Circumferential Groove 42 Located Adjacent to Curved Land Surface 46B is Shoulder Circumferential Groove 42s]

In the case where the second circumferential groove 42n is the shoulder circumferential groove 42s located on the outermost side in the axial direction, the second land surface 46n in FIG. 7 can form the shoulder land surface 46s of the tire 92. From the viewpoint of obtaining a more appropriate ground-contact surface shape and a more appropriate ground-contact pressure distribution, of the contour of the shoulder land surface 46s in the tread surface 96, the contour from the shoulder reference boundary point BBst to the shoulder reference tangent point Tst can be represented by the following two circular arcs. The following will describe the contour, of the shoulder land surface 46s, from the shoulder reference boundary point BBst to the shoulder reference tangent point Tst with reference to FIG. 7.

In FIG. 7, reference character Kst can represent any position that is on the virtual line BLst of the facing wall 50b of the second circumferential groove 42n and that is between the shoulder reference boundary point BBst and the shoulder reference virtual point of intersection BVst. The position Kst can be a shoulder vertical point. A double-headed arrow Xkst can represent the distance from the shoulder reference virtual point of intersection BVst to the shoulder vertical point Kst. The distance Xkst can be measured along the virtual line BLst of the facing wall 50b. In the tread surface 96, a circular arc that passes through the shoulder vertical point Kst and that is tangent to the reference surface TBL at the shoulder reference tangent point Tst can be a shoulder tangent point-side circular arc.

In FIG. 7, reference character Jst can represent any position that is on the reference surface TBL and that is between the shoulder reference tangent point Tst and the shoulder reference virtual point of intersection BVst. The position Jst is a shoulder horizontal point. A double-headed arrow Xjst can represent the distance from the shoulder reference virtual point of intersection BVst to the shoulder horizontal point Jst. The distance Xjst can be represented as the length of a line segment connecting the shoulder reference virtual point of intersection BVst and the shoulder horizontal point Jst. Reference character Mst can represent the point of intersection of the shoulder tangent point-side circular arc and a normal line that passes through the shoulder horizontal point Jst and that is normal to the reference surface TBL. The point of intersection Mst can be a shoulder intermediate boundary point. In the tread surface 96, a circular arc that passes through the shoulder reference boundary point BBst and that is tangent to the shoulder tangent point-side circular arc at the shoulder intermediate boundary point Mst can be a shoulder boundary-side circular arc.

In the tire 92, of the contour of the shoulder land surface 46s, the contour from the shoulder reference tangent point Tst to the shoulder intermediate boundary point Mst can be represented by the shoulder tangent point-side circular arc, and the contour from the shoulder intermediate boundary point Mst to the shoulder reference boundary point BBst can be represented by the shoulder boundary-side circular arc. The distance Xdst from the shoulder reference virtual point of intersection BVst to the shoulder reference boundary point BBst on the facing wall 50b of the second circumferential groove 42n can be equal to the distance Xd2t from the second reference virtual point of intersection BV2t to the second reference boundary point BB2t on the reference wall 50a, that is, the second reference wall 50a, and the distance Xwst from the shoulder reference virtual point of intersection BVst to the shoulder reference tangent point Tst can be equal to the distance Xw2t from the second reference virtual point of intersection BV2t to the reference tangent point Tt. Furthermore, the distance Xkst from the shoulder reference virtual point of intersection BVst to the shoulder vertical point Kst can be equal to the distance Xk2t from the second reference virtual point of intersection BV2t to the second vertical point K2t, and the distance Xjst from the shoulder reference virtual point of intersection BVst to the shoulder horizontal point Jst can be equal to the distance Xj2t from the second reference virtual point of intersection BV2t to the second horizontal point J2t.

In the production of the tire 92 as well, disturbance may be less likely to occur in the flow of the unvulcanized rubber pressed by the second projection 74n, and thus the shoulder land surface 46s in which the shape of the shoulder land surface-forming portion 76s is reflected can be formed. In the tire 92, an appropriate ground-contact surface shape and an appropriate ground-contact pressure distribution can be obtained. The tire 92 can achieve improvement of steering stability and wear resistance.

As described above, with the tire mold and the production method for a tire according to one or more embodiments the present disclosure, the ground-contact surface shape and the ground-contact pressure distribution of the tire can be made appropriate. In the tire obtained by the tire mold and the production method for a tire, an appropriate ground-contact surface shape and an appropriate ground-contact pressure distribution can be obtained, and thus steering stability and wear resistance can be improved. Embodiments of present disclosure can exhibit an excellent effect in the case of forming a circumferential groove having a groove width of not less than 9 mm and a relatively large groove cross-sectional area of not less than 45 mm$^2$ on a tread, for instance.

As described above, the projections on the tread-forming surface press the cap portion. Embodiments of the present disclosure can exhibit a remarkable effect in the case where a circumferential groove having a groove width of not less than 9 mm and a large groove cross-sectional area of not less than 45 mm$^2$ is formed on a cap portion, and the unvulcanized rubber for the cap portion can have a Mooney viscosity of not less than 80. The Mooney viscosity can mean a Mooney viscosity $M_{1+4}$(100° C.) and can be measured according to JIS K6300-1, for instance.

INDUSTRIAL APPLICABILITY

The above-described technology to make the ground-contact surface shape and the ground-contact pressure distribution of the tire appropriate can also be applied to various tires.

REFERENCE SIGNS LIST 2, 92 tire
2r unvulcanized tire
4, 94 tread 14 cord reinforcing layer
22, 96 tread surface
24, base portion
26 cap portion
34 belt
36 band
40 groove
42, 42s, 42m circumferential groove
44, 44s, 44m land portion
46, 46s, 46m, 46B, 46f, 46n land surface
48 bottom of circumferential groove 42
50, 50a, 50b wall of circumferential groove 42
56, 98 mold
58, 100 tread ring
64, 102 tread-forming surface
72 cavity face
74 projection
76, 76B, 76f, 76n land surface-forming portion
78 top surface of projection 74
80, 80a, 80b side surface of projection 74

The invention claimed is:

1. A tire mold used for producing a tire including a tread having a tread surface to come into contact with a road surface, at least two circumferential grooves being formed on the tread, thereby forming at least three land portions in the tread, the tread surface including the at least two circumferential grooves and at least three land surfaces that are outer surfaces of the at least three land portions, the tire mold comprising:

a tread-forming surface to shape the tread surface, wherein the tread-forming surface includes projections to form the circumferential grooves and land surface-forming portions to form the land surfaces, a surface that has a contour represented by at least one circular arc and that is tangent to the three land surface-forming portions aligned in an axial direction with the projections interposed therebetween is a reference forming surface of the tread-forming surface, among the three land surface-forming portions, a land surface-forming portion located between the two projections is a curved land surface-forming portion, the projections each include a reference side surface that is a side surface on the land surface-forming portion side, and a back side surface that is a side surface located on a back side of the reference side surface, a tangent point between the curved land surface-forming portion and the reference forming surface is a reference tangent point, a boundary between the reference side surface and the curved land surface-forming portion is a reference boundary point, a point of intersection of the reference forming surface and a virtual line of the reference side surface that extends from the reference boundary point toward the reference forming surface is a reference virtual point of intersection, a contour of the curved land surface-forming portion is represented by one or more circular arcs, the reference boundary point is located inward of the reference forming surface, under a condition that a first projection of the two projects has a first cross-sectional area, and the second projection of the two projects has a second cross-sectional area greater than the first cross-sectional area of the first projection, a first distance from the reference virtual point of intersection to the reference boundary point on the first projection side is shorter compared to a second distance from the reference virtual point of intersection to the reference boundary point on the second projection side is longer, of the contour of the curved land surface-forming portion, a contour from the reference tangent point to the reference boundary point is represented by a circular arc that passes through the reference boundary point and that is tangent to the reference forming surface at the reference tangent point, among the land surface-forming portions included in the tread-forming surface, a land surface-forming portion located on an outer side in the axial direction is a shoulder land surface-foil ling portion, among the three land surface-forming portions, a land surface-forming portion located adjacent to the curved land surface-forming portion is the shoulder land surface-forming portion, a side surface on the curved land surface-forming portion side of a projection located between the shoulder land surface-forming portion and the curved land surface-forming portion is the reference side surface, and a side surface on the shoulder land surface-forming portion side of said projection is the back side surface, a tangent point between the shoulder land surface-forming portion and the reference forming surface is a shoulder reference tangent point, a boundary between the back side surface and the shoulder land surface-forming portion is a shoulder reference boundary point, a point of intersection of the reference forming surface and a virtual line of the back side surface that extends from the shoulder reference boundary point to the reference forming surface is a shoulder reference virtual point of intersection, a distance from the shoulder reference virtual point of intersection to the shoulder reference boundary point at the back side surface is equal to a distance from the reference virtual point of intersection to the reference boundary point at the reference side surface, a distance from the shoulder reference virtual point of intersection to the shoulder reference tangent point is equal to the distance from the reference virtual point of intersection to the reference tangent point, and of a contour of the shoulder land surface-forming portion, a contour from the shoulder reference tangent point to the shoulder reference boundary point is represented by a circular arc that passes through the shoulder reference boundary point and that is tangent to the reference forming surface at the shoulder reference tangent point.

2. The tire mold according to claim 1, wherein, when a distance from the reference virtual point of intersection to the reference tangent point on a first side of the first projection side is denoted by $Xw1m$, a distance from the reference virtual point of intersection on the first side of the first projection to the reference virtual point of intersection on a second side of the second projection is denoted by $Wcm$, a cross-sectional area of the first projection is denoted by $Sam$, and a cross-sectional area of the second projection is denoted by $Sbm$, the distance $Xw1m$ from the reference virtual point of intersection to the reference tangent point on the second side is set such that the following formula (1) is satisfied, $$Sam/(Sam+Sbm)\times 100-10 \leq Xw1m/Wcm \times 100 \leq Sam/(Sam+Sbm)\times 100+10 \quad (1)$$

3. The tire mold according to claim 1, wherein a ratio of the distance from the reference virtual point of intersection to the reference boundary point to the cross-sectional area of the first projection is not less than 0.0008 and not greater than 0.0040.

4. The tire mold according to claim 1, wherein
any position that is on a virtual line of the reference side surface and that is between the reference boundary point and the reference virtual point of intersection is a vertical point,
a circular arc that passes through the vertical point and that is tangent to the reference forming surface at the reference tangent point is a tangent point-side circular arc,
any position that is on the reference forming surface and that is between the reference tangent point and the reference virtual point of intersection is a horizontal point,
a point of intersection of the tangent point-side circular arc and a normal line that passes through the horizontal point and that is normal to the reference forming surface is an intermediate boundary point,
a circular arc that passes through the reference boundary point and that is tangent to the tangent point-side circular arc at the intermediate boundary point is a boundary-side circular arc, and
of the contour of the curved land surface-forming portion, a contour from the reference tangent point to the intermediate boundary point is represented by the tangent point-side circular arc, and a contour from the intermediate boundary point to the reference boundary point is represented by the boundary-side circular arc.

5. The tire mold according to claim 4, wherein
a ratio of a distance from the reference virtual point of intersection to the vertical point to the distance from the reference virtual point of intersection to the reference boundary point is not less than 0.40 and not greater than 0.60, and
a ratio of a distance from the reference virtual point of intersection to the horizontal point to the distance from the reference virtual point of intersection to the reference tangent point is not less than 0.40 and not greater than 0.60.

6. The tire mold according to claim 4, wherein
any position that is on the virtual line of the back side surface and that is between the shoulder reference boundary point and the shoulder reference virtual point of intersection is a shoulder vertical point,
a circular arc that passes through the shoulder vertical point and that is tangent to the reference forming surface at the shoulder reference tangent point is a shoulder tangent point-side circular arc,
any position that is on the reference forming surface and that is between the shoulder reference tangent point and the shoulder reference virtual point of intersection is a shoulder horizontal point,
a point of intersection of the shoulder tangent point-side circular arc and a normal line that passes through the shoulder horizontal point and that is normal to the reference forming surface is a shoulder intermediate boundary point,
a circular arc that passes through the shoulder reference boundary point and that is tangent to the shoulder tangent point-side circular arc at the shoulder intermediate boundary point is a shoulder boundary-side circular arc,
of a contour of the shoulder land surface-forming portion, a contour from the shoulder reference tangent point to the shoulder intermediate boundary point is represented by the shoulder tangent point-side circular arc, and a contour from the shoulder intermediate boundary point to the shoulder reference boundary point is represented by the shoulder boundary-side circular arc,
a distance from the shoulder reference virtual point of intersection to the shoulder vertical point is equal to the distance from the reference virtual point of intersection to the vertical point, and
a distance from the shoulder reference virtual point of intersection to the shoulder horizontal point is equal to the distance from the reference virtual point of intersection to the horizontal point.

7. The tire mold according to claim 1, wherein
the tread includes a cap portion including the tread surface, and
a vulcanized rubber for the cap portion has a Mooney viscosity of not less than 80.

8. The tire mold according to claim 1, wherein
when a distance from the reference virtual point of intersection to the reference tangent point on a first side of the first projection side is denoted by $Xw1m$, a distance from the reference virtual point of intersection on the first side of the first projection to the reference virtual point of intersection on a second side of the second projection is denoted by $Wcm$, a cross-sectional area of the first projection is denoted by $Sam$, and a cross-sectional area of the second projection is denoted by $Sbm$, the distance $Xw1m$ from the reference virtual point of intersection to the reference tangent point on the second side is set such that the following formula (1) is satisfied, $$Sam/(Sam+Sbm) \times 100-10 \leq Xw1m/Wcm \times 100 \leq Sam/(Sam+Sbm) \times 100+10 \qquad (1),$$

and a ratio of the distance from the reference virtual point of intersection to the reference boundary point to the cross-sectional area of the first projection is not less than 0.0008 and not greater than 0.0040.

9. The tire mold according to claim 1, wherein
when a distance from the reference virtual point of intersection to the reference tangent point on a first side of the first projection side is denoted by $Xw1m$, a distance from the reference virtual point of intersection on the first side of the first projection to the reference virtual point of intersection on a second side of the second projection is denoted by $Wcm$, a cross-sectional area of the first projection is denoted by $Sam$, and a cross-sectional area of the second projection is denoted by $Sbm$, the distance $Xw1m$ from the reference virtual point of intersection to the reference tangent point on the second side is set such that the following formula (1) is satisfied, $$Sam/(Sam+Sbm) \times 100-10 \leq Xw1m/Wcm \times 100 \leq Sam/(Sam+Sbm) \times 100+10 \qquad (1),$$

any position that is on a virtual line of the reference side surface and that is between the reference boundary point and the reference virtual point of intersection is a vertical point,
a circular arc that passes through the vertical point and that is tangent to the reference forming surface at the reference tangent point is a tangent point-side circular arc, any position that is on the reference forming surface and that is between the reference tangent point and the reference virtual point of intersection is a horizontal point,
a point of intersection of the tangent point-side circular arc and a normal line that passes through the horizontal point and that is normal to the reference forming surface is an intermediate boundary point,
a circular arc that passes through the reference boundary point and that is tangent to the tangent point-side circular arc at the intermediate boundary point is a boundary-side circular arc, and
of the contour of the curved land surface-forming portion, a contour from the reference tangent point to the intermediate boundary point is represented by the tangent point-side circular arc, and a contour from the intermediate boundary point to the reference boundary point is represented by the boundary-side circular arc.

10. The tire mold according to claim 1, wherein
when a distance from the reference virtual point of intersection to the reference tangent point on a first side of the first projection side is denoted by $Xw1m$, a distance from the reference virtual point of intersection on the first side of the first projection to the reference virtual point of intersection on a second side of the second projection is denoted by Wcm, a cross-sectional area of the first projection is denoted by Sam, and a cross-sectional area of the second projection is denoted by Sbm, the distance $Xw1m$ from the reference virtual point of intersection to the reference tangent point on the second side is set such that the following formula (1) is satisfied, $$Sam/(Sam+Sbm) \times 100-10 \leq Xw1m/Wcm \times 100 \leq Sam/(Sam+Sbm) \times 100+10 \qquad (1),$$

any position that is on a virtual line of the reference side surface and that is between the reference boundary point and the reference virtual point of intersection is a vertical point,
a circular arc that passes through the vertical point and that is tangent to the reference totaling surface at the reference tangent point is a tangent point-side circular arc,
any position that is on the reference forming surface and that is between the reference tangent point and the reference virtual point of intersection is a horizontal point,
a point of intersection of the tangent point-side circular arc and a normal line that passes through the horizontal point and that is normal to the reference forming surface is an intermediate boundary point,
a circular arc that passes through the reference boundary point and that is tangent to the tangent point-side circular arc at the intermediate boundary point is a boundary-side circular arc,
of the contour of the curved land surface-forming portion, a contour from the reference tangent point to the intermediate boundary point is represented by the tangent point-side circular arc, and a contour from the intermediate boundary point to the reference boundary point is represented by the boundary-side circular arc,
a ratio of a distance from the reference virtual point of intersection to the vertical point to the distance from the reference virtual point of intersection to the reference boundary point is not less than 0.40 and not greater than 0.60, and a ratio of a distance from the reference virtual point of intersection to the horizontal point to the distance from the reference virtual point of intersection to the reference tangent point is not less than 0.40 and not greater than 0.60.

11. The tire mold according to claim 1, wherein
when a distance from the reference virtual point of intersection to the reference tangent point on a first side of the first projection side is denoted by $Xw1m$, a distance from the reference virtual point of intersection on the first side of the first projection to the reference virtual point of intersection on a second side of the second projection is denoted by Wcm, a cross-sectional area of the first projection is denoted by Sam, and a cross-sectional area of the second projection is denoted by Sbm, the distance $Xw1m$ from the reference virtual point of intersection to the reference tangent point on the second side is set such that the following formula (1) is satisfied, $$Sam/(Sam+Sbm) \times 100-10 \leq Xw1m/Wcm \times 100 \leq Sam/(Sam+Sbm) \times 100+10 \qquad (1),$$

a ratio of the distance from the reference virtual point of intersection to the reference boundary point to the cross-sectional area of the first projection is not less than 0.0008 and not greater than 0.0040,
any position that is on a virtual line of the reference side surface and that is between the reference boundary point and the reference virtual point of intersection is a vertical point,
a circular arc that passes through the vertical point and that is tangent to the reference forming surface at the reference tangent point is a tangent point-side circular arc,
any position that is on the reference forming surface and that is between the reference tangent point and the reference virtual point of intersection is a horizontal point,
a point of intersection of the tangent point-side circular arc and a normal line that passes through the horizontal point and that is normal to the reference forming surface is an intermediate boundary point,
a circular arc that passes through the reference boundary point and that is tangent to the tangent point-side circular arc at the intermediate boundary point is a boundary-side circular arc, and
of the contour of the curved land surface-forming portion, a contour from the reference tangent point to the intermediate boundary point is represented by the tangent point-side circular arc, and a contour from the intermediate boundary point to the reference boundary point is represented by the boundary-side circular arc.

12. The tire mold according to claim 1, wherein
when a distance from the reference virtual point of intersection to the reference tangent point on a first side of the first projection side is denoted by $Xw1m$, a distance from the reference virtual point of intersection on the first side of the first projection to the reference virtual point of intersection on a second side of the second projection is denoted by Wcm, a cross-sectional area of the first projection is denoted by Sam, and a cross-sectional area of the second projection is denoted by Sbm, the distance $Xw1m$ from the reference virtual point of intersection to the reference tangent point on the second side is set such that the following formula (1) is satisfied, $$Sam/(Sam+Sbm)\times100-10 \leq Xw1m/Wcm\times100 \leq Sam/(Sam+Sbm)\times100+10 \qquad (1),$$

a ratio of the distance from the reference virtual point of intersection to the reference boundary point to the cross-sectional area of the first projection is not less than 0.0008 and not greater than 0.0040, any position that is on a virtual line of the reference side surface and that is between the reference boundary point and the reference virtual point of intersection is a vertical point, a circular arc that passes through the vertical point and that is tangent to the reference forming surface at the reference tangent point is a tangent point-side circular arc, any position that is on the reference forming surface and that is between the reference tangent point and the reference virtual point of intersection is a horizontal point, a point of intersection of the tangent point-side circular arc and a normal line that passes through the horizontal point and that is normal to the reference forming surface is an intermediate boundary point, a circular arc that passes through the reference boundary point and that is tangent to the tangent point-side circular arc at the intermediate boundary point is a boundary-side circular arc, and of the contour of the curved land surface-forming portion, a contour from the reference tangent point to the intermediate boundary point is represented by the tangent point-side circular arc, and a contour from the intermediate boundary point to the reference boundary point is represented by the boundary-side circular arc, a ratio of a distance from the reference virtual point of intersection to the vertical point to the distance from the reference virtual point of intersection to the reference boundary point is not less than 0.40 and not greater than 0.60, and a ratio of a distance from the reference virtual point of intersection to the horizontal point to the distance from the reference virtual point of intersection to the reference tangent point is not less than 0.40 and not greater than 0.60.

13. A production method for a tire including a tread having a tread surface to come into contact with a road surface using the tire mold according to claim 1.

14. A tire mold used for producing a tire including a tread having a tread surface to come into contact with a road surface, at least two circumferential grooves being formed on the tread, thereby forming at least three land portions in the tread, the tread surface including the at least two circumferential grooves and at least three land surfaces that are outer surfaces of the at least three land portions, the tire mold comprising:

a tread-forming surface to shape the tread surface, wherein the tread-forming surface includes projections to form the circumferential grooves and land surface-forming portions to form the land surfaces, a surface that has a contour represented by at least one circular arc and that is tangent to the three land surface-forming portions aligned in an axial direction with the projections interposed therebetween is a reference forming surface of the tread-forming surface, among the three land surface-forming portions, a land surface-forming portion located between the two projections is a curved land surface-forming portion, the projections each include a reference side surface that is a side surface on the land surface-forming portion side, and a back side surface that is a side surface located on a back side of the reference side surface, a tangent point between the curved land surface-forming portion and the reference forming surface is a reference tangent point, a boundary between the reference side surface and the curved land surface-forming portion is a reference boundary point, a point of intersection of the reference forming surface and a virtual line of the reference side surface that extends from the reference boundary point toward the reference forming surface is a reference virtual point of intersection, a contour of the curved land surface-forming portion is represented by one or more circular arcs, the reference boundary point is located inward of the reference forming surface, under a condition that a first projection of the two projects has a first cross-sectional area, and the second projection of the two projects has a second cross-sectional area greater than the first cross-sectional area of the first projection, a first distance from the reference virtual point of intersection to the reference boundary point on the first projection side is shorter compared to a second distance from the reference virtual point of intersection to the reference boundary point on the second projection side is longer, any position that is on a virtual line of the reference side surface and that is between the reference boundary point and the reference virtual point of intersection is a vertical point, a circular arc that passes through the vertical point and that is tangent to the reference forming surface at the reference tangent point is a tangent point-side circular arc, any position that is on the reference forming surface and that is between the reference tangent point and the reference virtual point of intersection is a horizontal point, a point of intersection of the tangent point-side circular arc and a normal line that passes through the horizontal point and that is normal to the reference forming surface is an intermediate boundary point, a circular arc that passes through the reference boundary point and that is tangent to the tangent point-side circular arc at the intermediate boundary point is a boundary-side circular arc, and of the contour of the curved land surface-forming portion, a contour from the reference tangent point to the intermediate boundary point is represented by the tangent point-side circular arc, and a contour from the intermediate boundary point to the reference boundary point is represented by the boundary-side circular arc, among the land surface-forming portions included in the tread-forming surface, a land surface-forming portion located on an outer side in the axial direction is a shoulder land surface-forming portion, among the three land surface-forming portions, a land surface-forming portion located adjacent to the curved land surface-forming portion is the shoulder land surface-forming portion, a side surface on the curved land surface-forming portion side of a projection located between the shoulder land surface-forming portion and the curved land surface-forming portion is the reference side surface, and a side surface on the shoulder land surface-forming portion side of said projection is the back side surface, a tangent point between the shoulder land surface-forming portion and the reference forming surface is a shoulder reference tangent point, a boundary between the back side surface and the shoulder land surface-forming portion is a shoulder reference boundary point, a point of intersection of the reference forming surface and a virtual line of the back side surface that extends from the shoulder reference boundary point to the reference forming surface is a shoulder reference virtual point of intersection, a distance from the shoulder reference virtual point of intersection to the shoulder reference boundary point at the back side surface is equal to a distance from the reference virtual point of intersection to the reference boundary point at the reference side surface, a distance from the shoulder reference virtual point of intersection to the shoulder reference tangent point is equal to the distance from the reference virtual point of intersection to the reference tangent point, any position that is on the virtual line of the back side surface and that is between the shoulder reference boundary point and the shoulder reference virtual point of intersection is a shoulder vertical point, a circular arc that passes through the shoulder vertical point and that is tangent to the reference forming surface at the shoulder reference tangent point is a shoulder tangent point-side circular arc, any position that is on the reference forming surface and that is between the shoulder reference tangent point and the shoulder reference virtual point of intersection is a shoulder horizontal point, a point of intersection of the shoulder tangent point-side circular arc and a normal line that passes through the shoulder horizontal point and that is normal to the reference forming surface is a shoulder intermediate boundary point, a circular arc that passes through the shoulder reference boundary point and that is tangent to the shoulder tangent point-side circular arc at the shoulder intermediate boundary point is a shoulder boundary-side circular arc, of a contour of the shoulder land surface-forming portion, a contour from the shoulder reference tangent point to the shoulder intermediate boundary point is represented by the shoulder tangent point-side circular arc, and a contour from the shoulder intermediate boundary point to the shoulder reference boundary point is represented by the shoulder boundary-side circular arc, a distance from the shoulder reference virtual point of intersection to the shoulder vertical point is equal to the distance from the reference virtual point of intersection to the vertical point, and a distance from the shoulder reference virtual point of intersection to the shoulder horizontal point is equal to the distance from the reference virtual point of intersection to the horizontal point.

15. A tire mold used for producing a tire including a tread having a tread surface to come into contact with a road surface, at least two circumferential grooves being formed on the tread, thereby forming at least three land portions in the tread, the tread surface including the at least two circumferential grooves and at least three land surfaces that are outer surfaces of the at least three land portions, the tire mold comprising:

a tread-forming surface to shape the tread surface, wherein the tread-forming surface includes projections to form the circumferential grooves and land surface-forming portions to form the land surfaces, a surface that has a contour represented by at least one circular arc and that is tangent to the three land surface-forming portions aligned in an axial direction with the projections interposed therebetween is a reference forming surface of the tread-forming surface, among the three land surface-forming portions, a land surface-forming portion located between the two projections is a curved land surface-forming portion, the projections each include a reference side surface that is a side surface on the land surface-forming portion side, and a back side surface that is a side surface located on a back side of the reference side surface, a tangent point between the curved land surface-forming portion and the reference forming surface is a reference tangent point, a boundary between the reference side surface and the curved land surface-forming portion is a reference boundary point, a point of intersection of the reference forming surface and a virtual line of the reference side surface that extends from the reference boundary point toward the reference forming surface is a reference virtual point of intersection, a contour of the curved land surface-forming portion is represented by one or more circular arcs, the reference boundary point is located inward of the reference forming surface, under a condition that a first projection of the two projects has a first cross-sectional area, and the second projection of the two projects has a second cross-sectional area greater than the first cross-sectional area of the first projection, a first distance from the reference virtual point of intersection to the reference boundary point on the first projection side is shorter compared to a second distance from the reference virtual point of intersection to the reference boundary point on the second projection side is longer, a virtual tread surface obtained on the assumption that the grooves are not present on the tread is a reference surface of the tread surface, the reference forming surface of the tread-forming surface correspond to the reference surface of the tread surface, and land surface-forming portions do not swell outward from the reference forming surface of the tread-forming surface in the radial direction.

* * * * *